United States Patent
Raghavan et al.

(10) Patent No.: US 11,595,959 B2
(45) Date of Patent: Feb. 28, 2023

(54) TECHNIQUES FOR ARRAY SPECIFIC BEAM REFINEMENT

(71) Applicant: QUALCOMM incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/148,300

(22) Filed: Jan. 13, 2021

(65) Prior Publication Data

US 2022/0225318 A1     Jul. 14, 2022

(51) Int. Cl.
| | |
|---|---|
| *H04W 72/04* | (2009.01) |
| *H04L 5/00* | (2006.01) |
| *H04W 76/14* | (2018.01) |
| *H04W 72/044* | (2023.01) |

(52) U.S. Cl.
CPC ......... *H04W 72/048* (2013.01); *H04L 5/0051* (2013.01); *H04W 72/044* (2013.01); *H04W 76/14* (2018.02)

(58) Field of Classification Search
CPC . H04W 72/048; H04W 72/044; H04W 72/04; H04W 76/14; H04L 5/0051
USPC .................................................. 370/329–330
See application file for complete search history.

(56) References Cited

U.S. PATENT DOCUMENTS

| | | | |
|---|---|---|---|
| 2016/0172754 A1* | 6/2016 | Zhai | H01Q 21/30 342/368 |
| 2018/0184441 A1 | 6/2018 | Faxer et al. | |
| 2019/0173177 A1* | 6/2019 | Johansson | H01Q 1/246 |
| 2019/0239092 A1* | 8/2019 | Zhou | H04W 72/046 |
| 2021/0234591 A1* | 7/2021 | Eleftheriadis | H04W 52/0206 |

OTHER PUBLICATIONS

International Search Report and Written Opinion—PCT/US2021/062680—ISA/EPO—dated May 6, 2022 (2100868WO).

(Continued)

*Primary Examiner* — Candal Elpenord
(74) *Attorney, Agent, or Firm* — Dalei Dong; Holland & Hart LLP

(57) ABSTRACT

Techniques and devices for wireless communications are described. A first wireless device may establish a communications link with a second wireless device in a first radio frequency spectrum band. When transmitting a beamformed transmission in the first radio frequency spectrum band, an antenna array at the first wireless device may generate a grating lobe. The grating lobe may result in a beam ambiguity when the first wireless device switches to a second radio frequency spectrum band. The first wireless device may receive one or more reference signals from the second wireless device in the second radio frequency spectrum band. The reference signals may include a respective reference signal for each lobe (e.g., a main lobe and one or more grating lobes) identified in the beamformed communications link in the first radio frequency spectrum band. The first wireless device may use the reference signals to resolve the beam ambiguity.

44 Claims, 16 Drawing Sheets

(56) References Cited

OTHER PUBLICATIONS

Qualcomm Incorporated: "Beam Squint Analysis for FR2 UEs", 3GPP Draft, R4-2006781, 3GPP TSG-RAN WG4 Meeting #95-e, 3rd Generation Partnership Project (3GPP), Mobile Competence Centre, 650, Route Des Lucioles, F-06921 Sophia-Antipolis Cedex, France, vol. RAN WG4, no. Online; May 1, 2020, May 15, 2020 (May 15, 2020), XP051883826, 16 Pages, Retrieved from the Internet: URL:https://ftp.3gpp.org/tsg_ran/WG4_Radio/TSGR4_95_e/Docs/R4-2006781.zip, R4-200678_BSQ.docx [retrieved on May 15, 2020] the whole document, Section 2, Figure 2.0-1.

Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, no. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3, Section 4.2, Inter-carrier QCL.

Sony, et al., "Preliminary Analysis on Beam Squint Due to Larger Frequency Separation for PC3 UEs", 3GPP Draft, R4-2003349, 3GPP TSG-RAN WG4 Meeting #94-e-bis, 3rd Generation Partnership Project (3GPP), Mobile Competence Centre, 650, Route Des Lucioles, F-06921, Sophia-Antipolis Cedex, France, vol. RAN WG4, no. Online Meeting, Apr. 20, 2020-Apr. 30, 2020, Apr. 10, 2020 (Apr. 10, 2020), XP051871993, 3 Pages, Retrieved from the Internet: URL:https://ftp.3gpp.org/tsg_ran/WG4_Radio/TSGR4_94_eBis/Docs/R4-2003349.zip R4-2003349 Preliminary analysis on beam squint due to larger frequency separation for PC3UEs.docx [retrieved on Apr. 10, 2020] Section 2.

* cited by examiner

TECHNIQUES FOR ARRAY SPECIFIC BEAM REFINEMENT

FIELD OF DISCLOSURE

The following relates to wireless communications, including techniques for array specific beam refinement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless devices may be configured to communicate using beamformed transmissions. However, for some use cases, conventional beamforming techniques may be deficient or sub-optimal in some current configurations.

SUMMARY

The described techniques relate to improved methods, systems, devices, and apparatuses that support techniques for array specific beam refinement. For example, the described techniques provide for enabling a first wireless device to resolve ambiguity in beamformed communications with a second wireless device. The first wireless device may establish a beamformed communications link with the second wireless device in a first radio frequency spectrum band (e.g., at a frequency that produces one or more grating lobes). When transmitting a beamformed transmission in the first radio frequency spectrum band, an antenna array at the first wireless device may generate a grating lobe. The generated grating lobe may result in ambiguity when the first wireless device performs a beam search algorithm after switching to operation in a second radio frequency spectrum band. The first wireless device may receive one or more reference signals from the second wireless device in the second radio frequency spectrum band, for example based on a request from the first wireless device. The reference signals may include a respective reference signal for each lobe (e.g., a main lobe and one or more grating lobes) identified in the beamformed communications link in the first radio frequency spectrum band. The first wireless device may use the reference signals to resolve the beam ambiguity, which may improve communications reliability and efficiency, among other benefits.

A method for wireless communications at a first wireless device is described. The method may include establishing a communications link with a second wireless device in a first radio frequency spectrum band, receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link, and communicating with the second wireless device according to a beam configuration in the second radio frequency spectrum band, the beam configuration based on the received set of reference signals, the beam configuration including a second beam direction of the set of beam directions.

An apparatus for wireless communications at a first wireless device is described. The apparatus may include a processor, memory in electronic communication with the processor, and instructions stored in the memory. The instructions may be executable by the processor to cause the apparatus to establish a communications link with a second wireless device in a first radio frequency spectrum band, receive, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link, and communicate with the second wireless device according to a beam configuration in the second radio frequency spectrum band, the beam configuration based on the received set of reference signals, the beam configuration including a second beam direction of the set of beam directions.

Another apparatus for wireless communications at a first wireless device is described. The apparatus may include means for establishing a communications link with a second wireless device in a first radio frequency spectrum band, means for receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link, and means for communicating with the second wireless device according to a beam configuration in the second radio frequency spectrum band, the beam configuration based on the received set of reference signals, the beam configuration including a second beam direction of the set of beam directions.

A non-transitory computer-readable medium storing code for wireless communications at a first wireless device is described. The code may include instructions executable by a processor to establish a communications link with a second wireless device in a first radio frequency spectrum band, receive, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link, and communicate with the second wireless device according to a beam configuration in the second radio frequency spectrum band, the beam configuration based on the received set of reference signals, the beam configuration including a second beam direction of the set of beam directions.

Some examples of the method, apparatuses, and non-transitory computer-readable medium described herein may further include operations, features, means, or instructions for transmitting, to the second wireless device, a message indicating a request, where the received set of reference signals may be based on the transmitted message.

Some examples of the method, apparatuses, and non-transitory computer-readable medium described herein may further include operations, features, means, or instructions for determining a set of beam weights associated with the established communications link, where the transmitted message may be based on the determined set of beam weights.

In some examples of the method, apparatuses, and non-transitory computer-readable medium described herein, the first reference signal of the set of reference signals may be quasi-colocated with a signal transmitted via the established communications link in the first radio frequency spectrum band, the signal corresponding to the first beam direction of the set of beam directions.

In some examples of the method, apparatuses, and non-transitory computer-readable medium described herein, a first carrier frequency of the first radio frequency spectrum band may be greater than a second carrier frequency of the second radio frequency spectrum band.

In some examples of the method, apparatuses, and non-transitory computer-readable medium described herein, the set of reference signals include a synchronization signal block, a channel state information reference signal, a sounding reference signal, or any combination thereof.

In some examples of the method, apparatuses, and non-transitory computer-readable medium described herein, the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

In some examples of the method, apparatuses, and non-transitory computer-readable medium described herein, the element spacing at the antenna array may be based on a wavelength, the wavelength corresponding to the first carrier frequency of the first radio frequency spectrum band, the second carrier frequency of the second radio frequency spectrum band, or a third carrier frequency of a third radio frequency spectrum band.

In some examples of the method, apparatuses, and non-transitory computer-readable medium described herein, the grating lobe pattern associated with the first radio frequency spectrum band may be based on a set of beam weights associated with the established communications link in the first radio frequency spectrum band.

In some examples of the method, apparatuses, and non-transitory computer-readable medium described herein, the first radio frequency spectrum band may be a millimeter wave radio frequency spectrum band greater than 24.25 gigahertz (GHz).

In some examples of the method, apparatuses, and non-transitory computer-readable medium described herein, the first wireless device includes a user equipment, a customer premises equipment, a sidelink node, a relay node, an integrated access and backhaul node, a smart repeater, a radio frequency repeater, or any combination thereof.

A method for wireless communications at a first wireless device is described. The method may include establishing a communications link with a second wireless device in a first radio frequency spectrum band, transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link, and communicating with the second wireless device according to a beam configuration in the second radio frequency spectrum band, the beam configuration based on the transmitted set of reference signals, the beam configuration including a second beam direction of the set of beam directions.

An apparatus for wireless communications at a first wireless device is described. The apparatus may include a processor, memory in electronic communication with the processor, and instructions stored in the memory. The instructions may be executable by the processor to cause the apparatus to establish a communications link with a second wireless device in a first radio frequency spectrum band, transmit, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link, and communicate with the second wireless device according to a beam configuration in the second radio frequency spectrum band, the beam configuration based on the transmitted set of reference signals, the beam configuration including a second beam direction of the set of beam directions.

Another apparatus for wireless communications at a first wireless device is described. The apparatus may include means for establishing a communications link with a second wireless device in a first radio frequency spectrum band, means for transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link, and means for communicating with the second wireless device according to a beam configuration in the second radio frequency spectrum band, the beam configuration based on the transmitted set of reference signals, the beam configuration including a second beam direction of the set of beam directions.

A non-transitory computer-readable medium storing code for wireless communications at a first wireless device is described. The code may include instructions executable by a processor to establish a communications link with a second wireless device in a first radio frequency spectrum band, transmit, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link, and communicate with the second wireless device according to a beam configuration in the second radio frequency spectrum band, the beam configuration based on the transmitted set of reference signals, the beam configuration including a second beam direction of the set of beam directions.

Some examples of the method, apparatuses, and non-transitory computer-readable medium described herein may further include operations, features, means, or instructions for receiving, from the second wireless device, a message indicating a request, the transmitted set of reference signal based on the received message.

Some examples of the method, apparatuses, and non-transitory computer-readable medium described herein may further include operations, features, means, or instructions for determining a set of beam weights associated with the established communications link, where the received message may be based on the determined set of beam weights.

In some examples of the method, apparatuses, and non-transitory computer-readable medium described herein, the first reference signal of the set of reference signals may be quasi-colocated with a signal transmitted via the established communications link in the first radio frequency spectrum band, the signal corresponding to the first beam direction of the set of beam directions.

In some examples of the method, apparatuses, and non-transitory computer-readable medium described herein, a first carrier frequency of the first radio frequency spectrum band may be greater than a second carrier frequency of the second radio frequency spectrum band.

In some examples of the method, apparatuses, and non-transitory computer-readable medium described herein, the set of reference signals include a synchronization signal block, a channel state information reference signal, a sounding reference signal, or any combination thereof.

In some examples of the method, apparatuses, and non-transitory computer-readable medium described herein, the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

In some examples of the method, apparatuses, and non-transitory computer-readable medium described herein, the element spacing at the antenna array may be based on a wavelength, the wavelength corresponding to the first carrier frequency of the first radio frequency spectrum band, the second carrier frequency of the second radio frequency spectrum band, or a third carrier frequency of a third radio frequency spectrum band.

In some examples of the method, apparatuses, and non-transitory computer-readable medium described herein, the grating lobe pattern associated with the first radio frequency spectrum band may be based on a set of beam weights associated with the established communications link in the first radio frequency spectrum band.

In some examples of the method, apparatuses, and non-transitory computer-readable medium described herein, the first radio frequency spectrum band may be a millimeter wave radio frequency spectrum band greater than 24.25 gigahertz (GHz).

In some examples of the method, apparatuses, and non-transitory computer-readable medium described herein, the first wireless device includes a base station, a transmission/reception point, a user equipment, a customer premises equipment, a sidelink node, a relay node, an integrated access and backhaul node, a smart repeater, a radio frequency repeater, or any combination thereof.

DETAILED DESCRIPTION

Figure 1:
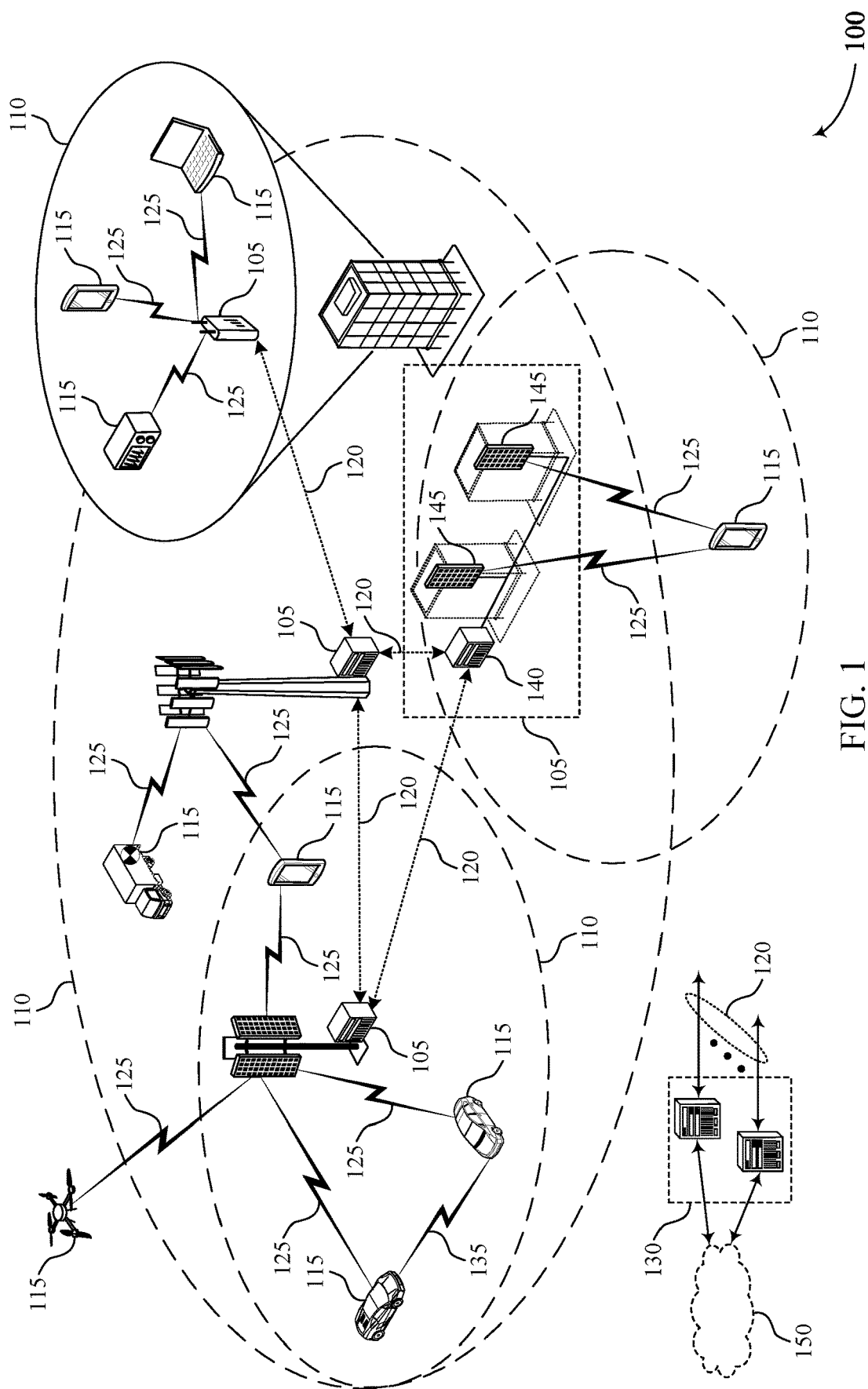
FIGS. 1 through 3 illustrate examples of wireless communications systems that support techniques for array specific beam refinement in accordance with aspects of the present disclosure.

Some wireless communication systems may include one or more wireless devices that support one or more multiple radio access technologies (RATs) including fourth generation (4G) systems such as Long Term Evolution (LTE) systems, fifth generation (5G) systems which may be referred to as New Radio (NR) systems, and Wi-Fi systems (e.g., wireless local area network (WLAN) systems). For example, a wireless communications system may include user equipment (UE), base stations, such as next-generation NodeBs or giga-NodeBs (either of which may be referred to as a gNB), integrated access and backhaul (IAB) nodes, repeaters (e.g., smart repeaters, dumb repeaters, radio frequency (RF) repeaters, among other examples), customer premises equipment (CPE), sidelink nodes, relay nodes, etc.

Devices in a wireless communications system (e.g., an NR system) may communicate using beamforming techniques, which may also be referred to as spatial filtering, directional transmission, or directional reception. In some cases, a first wireless device may communicate with a second wireless device using beamformed transmissions in a millimeter wave (mmW) radio frequency spectrum band. For example, a first frequency range may be referred to as FR4 and may include radio frequency spectrum bands between 52.6 gigahertz (GHz) and 114.25 GHz. A wavelength of transmissions in the first frequency range may be less than a wavelength of transmissions in a second frequency range. The second frequency range may be referred to as FR2 and may include radio frequency spectrum bands between 24.25 GHz and 52.6 GHz.

In some cases, more antenna elements may be included in a physical aperture (e.g., an antenna panel at a wireless device) configured for communications in the first frequency range compared to a physical aperture configured for communications in the second frequency range. In some cases, a wireless device may use a single radio frequency (RF) chain (e.g., a set of RF circuit components used to transmit or receive signals, including amplifiers, filters, mixers, analog-to-digital and digital-to-analog converters, attenuators, detectors, or other components) for communications in radio frequency spectrum bands in the first and second frequency ranges. However, using a single RF chain may lead to variations in performance in different frequency ranges. In some cases, switching operations from a radio frequency spectrum band in a lower frequency range (e.g., FR2) to a radio frequency spectrum band in a higher frequency range (e.g., FR4) may introduce unintended grating lobes in beamformed transmissions based on a fixed element spacing in an antenna array. The grating lobes may have a same gain as the main lobe, which may lead to ambiguities with beam management and refinement, unintended uplink interference, and inefficient power utilization at the wireless device.

According to the techniques described herein, a wireless device may support techniques for antenna array specific beam refinement. A first wireless device may establish a beamformed communications link with a second wireless device in a first radio frequency spectrum band (e.g., at a frequency that produces one or more grating lobes). When transmitting a beamformed transmission in the first radio frequency spectrum band, an antenna array at the first wireless device may generate a grating lobe. The generated grating lobe may result in a beam ambiguity when the first wireless device performs a beam search algorithm after switching to operation in a second radio frequency spectrum band. The first wireless device may receive one or more reference signals from the second wireless device in the second radio frequency spectrum band, for example based on a request from the first wireless device. The reference signals may include a respective reference signal for each lobe (e.g., a main lobe and one or more grating lobes) identified in the beamformed communications link in the first radio frequency spectrum band. The first wireless device may use the reference signals to resolve the beam ambiguity, which may improve communications reliability and efficiency, among other benefits.

Aspects of the disclosure are initially described in the context of wireless communications systems. Aspects of the disclosure are further illustrated by and described with reference to a process flow, apparatus diagrams, system diagrams, and flowcharts that relate to techniques for array specific beam refinement.

FIG. 1 illustrates an example of a wireless communications system 100 that supports techniques for array specific beam refinement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a wireless device (e.g., a UE 115, a base station 105, or another wireless device) may support techniques for antenna array specific beam refinement. A first wireless device may establish a beamformed communications link with a second wireless device in a first radio frequency spectrum band (e.g., at a frequency that produces one or more grating lobes). When transmitting a beamformed transmission in the first radio frequency spectrum band, an antenna array at the first wireless device may generate a grating lobe. The generated grating lobe may result in a beam ambiguity when the first wireless device performs a beam search algorithm after switching to operation in a second radio frequency spectrum band. The first wireless device may receive one or more reference signals from the second wireless device in the second radio frequency spectrum band, for example based on a request from the first wireless device. The reference signals may include a respective reference signal for each lobe (e.g., a main lobe and one or more grating lobes) identified in the beamformed communications link in the first radio frequency spectrum band. The first wireless device may use the reference signals to resolve the beam ambiguity, which may improve communications reliability and efficiency, among other benefits.

Figure 2:
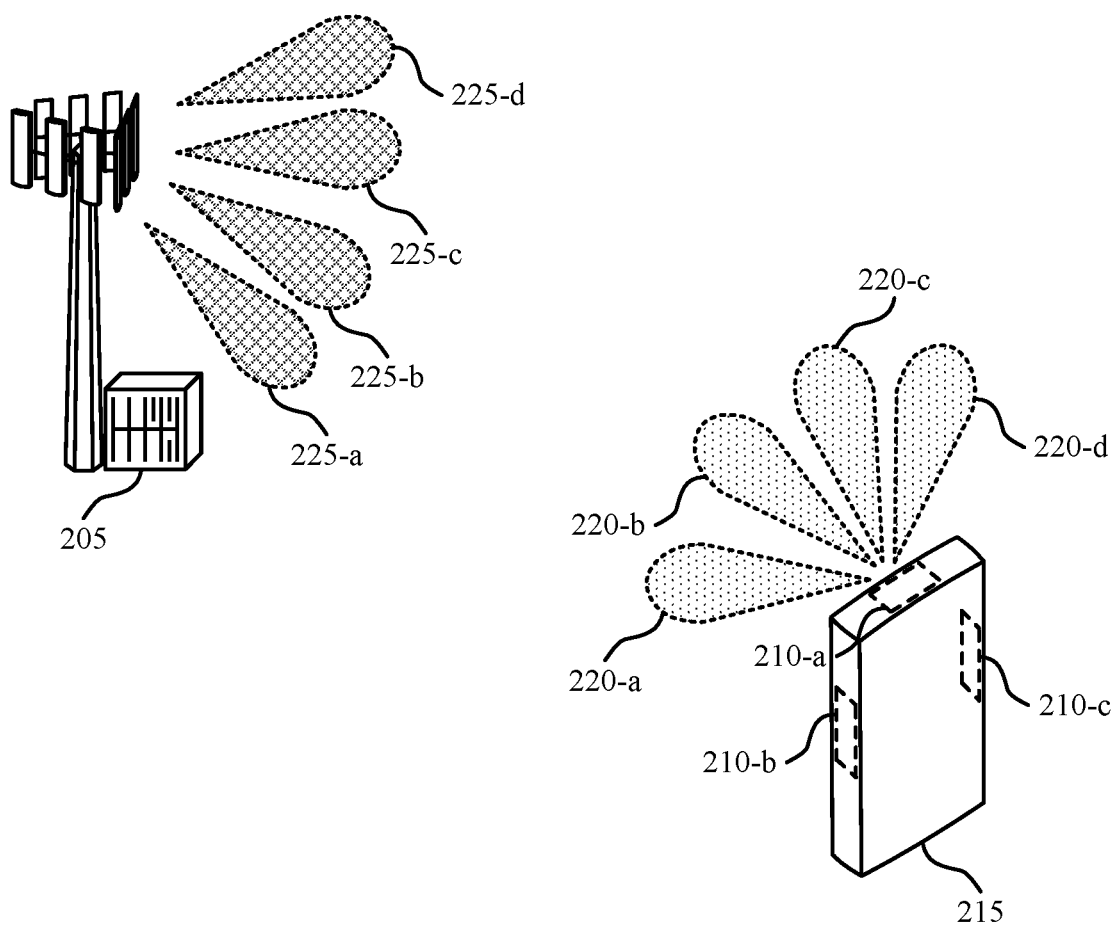

FIG. 2 illustrates an example of a wireless communications system 200 that supports techniques for array specific beam refinement in accordance with aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The wireless communications system 200 may include features for improved communications between the UE 215 and the base station 205, among other benefits.

The base station 205 may communicate with the UE 215 using beamforming techniques. For example, the base station 205 and the UE 215 may communicate with one another via one or more base station beams 225 and one or more UE beams 220. Individual base station beams 225 may correspond to individual UE beams 220 for communications in the wireless communications system 200. In some examples, the communications illustrated in FIG. 2 may include downlink transmissions to the UE 215, where the base station beams 225 may be transmission beams and the UE beams 220 may be reception beams. Additionally or alternatively, the communications illustrated in FIG. 2 may include uplink transmissions from the UE 215, where the base station beams 225 may be reception beams and the UE beams 220 may be transmission beams.

The UE 215 may include one or more antenna arrays 210 configured to transmit or receive beamformed transmissions (e.g., using the UE beams 220). The antenna arrays 210 may each include a set of antenna elements with an inter-element spacing. In some cases, the inter-element spacing of an antenna array 210-a may be different than the inter-element spacing of an antenna array 210-b or an antenna array 210-c. For example, the antenna array 210-a may be configured for communications in radio frequency spectrum bands between 24 GHz and 72 GHz, and the inter-element spacing (e.g., 4.2 millimeters (mm)) of the antenna array 210-a may be approximately half of a wavelength corresponding to a carrier frequency of 36 GHz. Additionally or alternatively, the antenna array 210-b and the antenna array 210-c may be configured for communications in radio frequency spectrum bands between 24 GHz and 30 GHz, and the inter-element spacings of the antenna array 210-b and the antenna array 210-c may be approximately half of a wavelength corresponding to a carrier frequency of 28 GHz.

In some cases, the UE 215 and the base station 205 may establish a beamformed link using the antenna array 210-a at a first radio frequency spectrum band (e.g., a radio frequency spectrum band with a carrier frequency of 72 GHz). The antenna array 210-a may generate the UE beams 220 for communications using the beamformed link. In some cases, the UE beam 220-a may be a main lobe, while the UE beam 220-b may be a grating lobe. For example, the antenna array 210-*a* may generate a grating lobe when the inter-element spacing at the antenna array 210 is greater than a half wavelength corresponding to the carrier frequency of a radio frequency spectrum band. In some examples, the UE 215 may switch the beamformed link from the first radio frequency spectrum band to a second radio frequency spectrum band (e.g., the second radio frequency spectrum band may have a carrier frequency of 36 GHz). The antenna array 210-*a* may not produce grating lobes at the second radio frequency spectrum band, for example based on the inter-element spacing at the antenna array 210-*a*. When switching from the first radio frequency spectrum band to the second radio frequency spectrum band, there may be a beam ambiguity at the antenna array 210-*a*. That is, the UE 215 may not be able to determine whether to steer beamformed transmissions in the direction of the UE beam 220-*a* or the UE beam 220-*b* when communicating in the second radio frequency spectrum band.

In some examples, the UE 215 may resolve the beam ambiguity by requesting a set of reference signals from the base station 205. In some examples, when switching from the first radio frequency spectrum band to the second radio frequency spectrum band, the UE 215 may request the set of reference signals (e.g., two reference signals) from the base station 205. In some cases, the reference signals may be sent in the second radio frequency spectrum band. The UE 215 may use the reference signals as part of a beam search algorithm to determine a UE beam 220 (e.g., the UE beam 220-*a*) for communications in the second radio frequency spectrum band. That is, the UE 215 may use the reference signals to resolve the beam ambiguity, which may improve reliability and efficiency of communications between the UE 215 and the base station 205, among other benefits.

Figure 3:
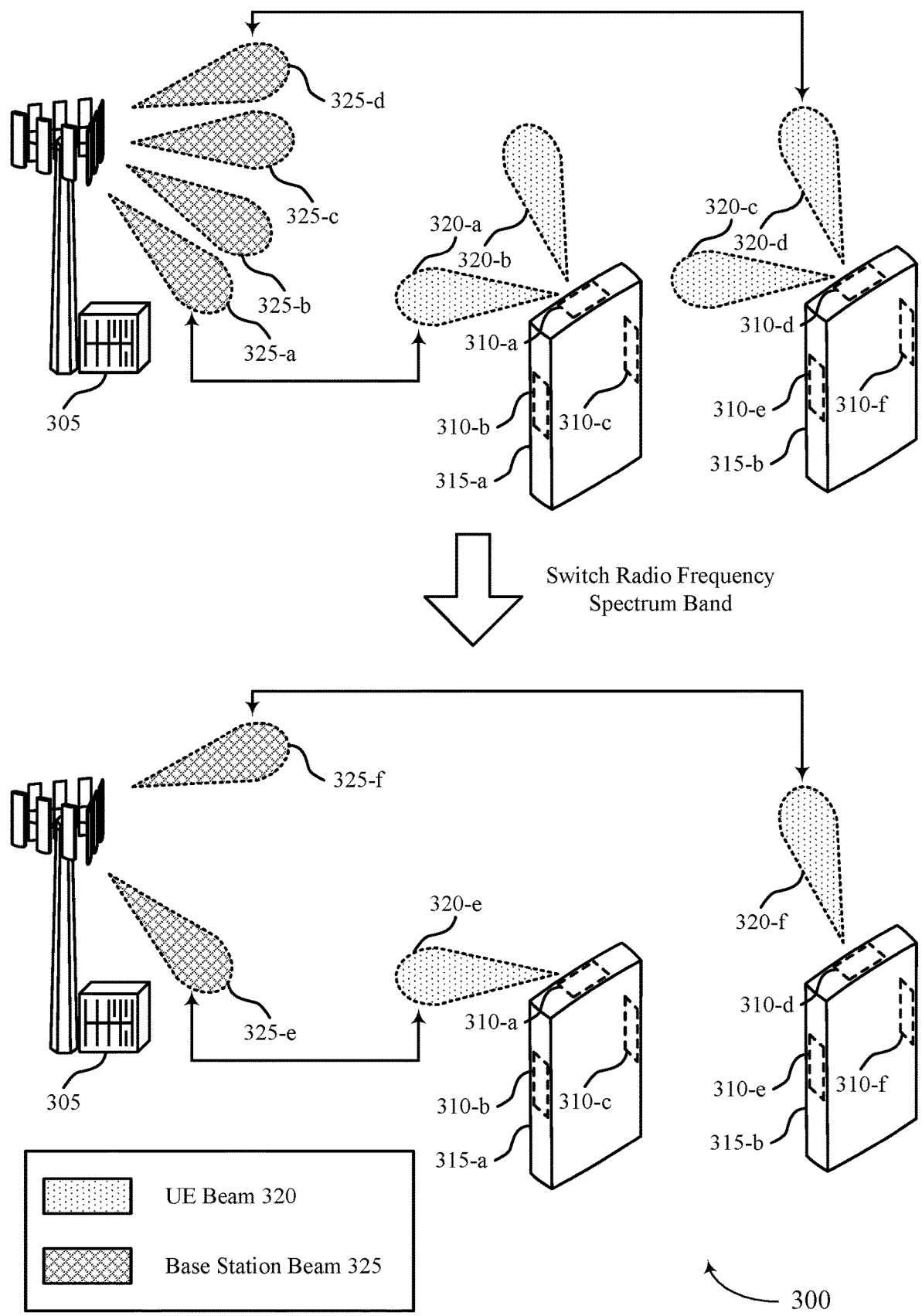

FIG. 3 illustrates an example of a wireless communications system 300 that supports techniques for array specific beam refinement in accordance with aspects of the present disclosure. In some examples, the wireless communications system 300 may implement aspects of the wireless communications system 100 or the wireless communications system 200. For example, the wireless communications system 300 may include a base station 305 and one or more UEs 315, which may be examples of the corresponding devices described with reference to FIGS. 1 and 2. The wireless communications system 300 may include features for improved communications between the UEs 315 and the base station 305, among other benefits.

The base station 305 may establish a respective beamformed link with each UE 315 (e.g., a UE 315-*a*) in a first radio frequency spectrum band (e.g., a radio frequency spectrum band with a carrier frequency of 72 GHz) based on pairing a UE beam 320 with a corresponding base station beam 325. For example, a base station beam 325-*a* may be paired with a UE beam 320-*a* for communication between the base station 305 and a UE 315-*a* in the first radio frequency spectrum band. Similarly, a base station beam 325-*d* may be paired with a UE beam 320-*d* for communication between the base station 305 and a UE 315-*b* in the first radio frequency spectrum band. The base station 305 may transmit a respective synchronization signal block (SSB) via each base station beam 325, where the transmitted SSB may identify the base station beam 325.

A UE 315 may configure one or more antenna arrays 310 to generate the UE beams 320. For example, the UE 315-*a* may generate the UE beam 320-*a*, which may be referred to as a main lobe, using an antenna array 310-*a*. In some cases, such as when an inter-element spacing at the antenna array 310-*a* is greater than a half wavelength corresponding to the carrier frequency of the first radio frequency spectrum band, the antenna array 310-*a* may generate a grating lobe (e.g., the UE beam 320-*b*) that points in a different direction than the generated UE beam 320-*a*. The UE 315-*a* may be unaware which generated UE beam 320 is paired with the base station beam 325-*a*. Similarly, an antenna array 310-*d* at the UE 315-*b* may generate the UE beams 320-*c* and 320-*d*, where one UE beam 320 (e.g., the UE beam 320-*c*) may be a main lobe and the other UE beam 320 (e.g., the UE beam 320-*d*) may be a grating lobe. The UE 315-*b* may be unaware which generated UE beam 320 is paired with the base station beam 325-*d*. The grating lobes may have a same gain as the main lobes, which may lead to ambiguities with beam management and refinement, unintended uplink interference, and inefficient power utilization at the UEs 315.

The UEs 315 may switch the beamformed link from the first radio frequency spectrum band to a second radio frequency spectrum band. For example, the UEs 315 may operate according to an inter-band carrier aggregation (CA) configuration that includes the first radio frequency spectrum band and the second radio frequency spectrum band. In some cases, the antenna arrays 310-*a* and 310-*d* may not generate grating lobes when generating UE beams 320 in the second radio frequency spectrum band. For example, the inter-element spacing (e.g., 4.2 mm) of the antenna arrays 210-*a* and 210-*d* may be approximately half of a wavelength corresponding to a carrier frequency (e.g., 36 GHz) of the second radio frequency spectrum band, which may reduce or eliminate the grating lobes generated when operating in the first radio frequency spectrum band. The lack of grating lobes may result in a beam ambiguity when the UEs 315 attempt to establish beamformed links in the second radio frequency spectrum band. In some cases, each UE 315 may perform a beam search algorithm based on the beam ambiguity to identify an appropriate direction to steer a UE beam 320 in the second radio frequency spectrum band, which may lead to power inefficiency or communications unreliability at the UEs 315.

According to the techniques described herein, the UEs 315 may resolve the beam ambiguity based on receiving one or more reference signals from the base station 305. For example, the UE 315-*a* may request a set of reference signals (e.g., two reference signals corresponding to the UE beams 320-*a* and 320-*b*) in the second radio frequency spectrum band. In some examples, the set of reference signals may include an SSB, a channel state information reference signal (CSI-RS), a sounding reference signal (SRS), or any combination thereof. Based on the received reference signals, the UE 315-*a* may use the antenna array 310-*a* to steer a UE beam 320-*e* in a direction corresponding to a base station beam 325-*e* and communicate with the base station 305 using a beamformed link. Similarly, the UE 315-*b* may use the antenna array 310-*d* to steer a UE beam 320-*f* in a direction corresponding to a base station beam 325-*f* based on a received set of reference signals, and communicate with the base station 305 using a beamformed link. Using the set of reference signals may improve power efficiency at the UEs 315, for example by reducing the amount of time and computing resources used to establish beamformed links with the base station 305.

In some examples, the UEs 315 may identify a quasi-colocation (QCL) relationship between the base station beams 325 in the first radio frequency spectrum band and base station beams 325 in the second radio frequency spectrum band. That is, the UEs 315 may identify that base station beams 325-*e* and 325-*f* carrying transmissions in the second radio frequency spectrum band each point in approximately a same direction as a respective base station beam 325 in the first radio frequency spectrum band. For example, the UE 315-*a* may identify a QCL relationship between the base station beam 325-*e* and the base station beam 325-*a*, and the UE 315-*b* may identify a QCL relationship between the base station beam 325-*f* and the base station beam 325-*d*. In some examples, the UEs 315 may receive the reference signals on the base station beams 325 with the identified QCL relationship, which may reduce ambiguity when identifying beam directions in the second radio frequency spectrum band.

Although FIG. 3 illustrates a respective antenna array 310 at each UE 315 generating a main lobe and a single grating lobe in the first radio frequency spectrum band, a respective antenna array 310 at each UE 315 may in some examples generate more than one grating lobe when establishing a beamformed link. A quantity of generated grating lobes may be based on an inter-element spacing at an antenna array 310 and the respective carrier frequencies of radio frequency spectrum bands in a switching operation. For example, an antenna array 310-*b* at the UE 315-*a* may have an inter-element spacing that is approximately half of a wavelength corresponding to a carrier frequency (e.g., 24 GHz) of a third radio frequency spectrum band. Based on the inter-element spacing at the antenna array 310-*b*, the antenna array 310-*b* may generate multiple grating lobes (e.g., two grating lobes) when generating a main lobe for a beamformed link in the first radio frequency spectrum band. Accordingly, the UE 315-*a* may request a corresponding number of reference signals (e.g., three reference signals) from the base station 305 to resolve the beam ambiguity when the UE 315-*a* switches the beamformed link from the first radio frequency spectrum band to the third radio frequency spectrum band.

Figure 4:
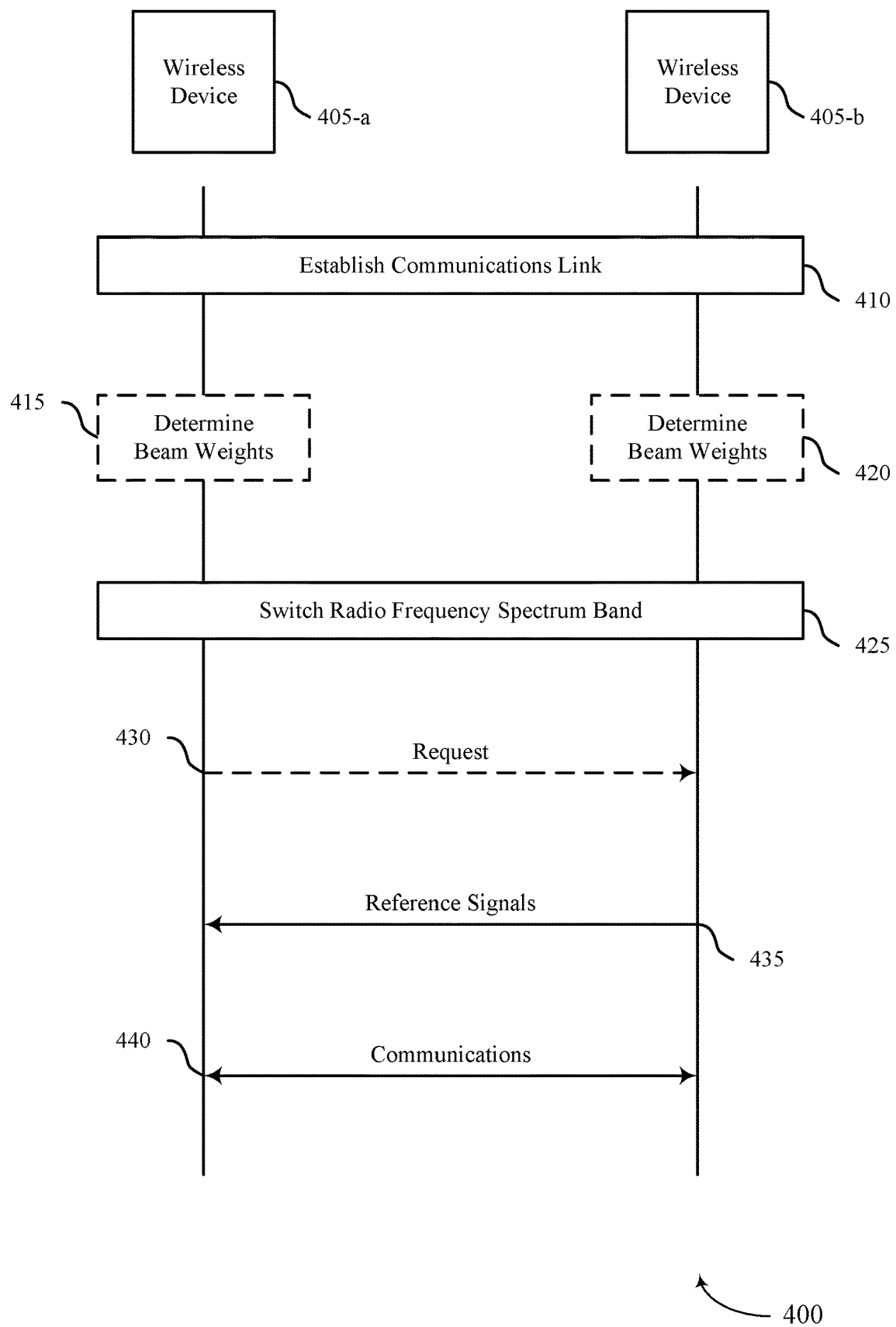
FIG. 4 illustrates an example of a process flow that supports techniques for array specific beam refinement in accordance with aspects of the present disclosure.

FIG. 4 illustrates an example of a process flow 400 that supports techniques for array specific beam refinement in accordance with aspects of the present disclosure. In some examples, the process flow 400 may implement one or more aspects of wireless communications systems 100 and 200. For example, the process flow 400 may include example operations associated with one or more wireless devices 405, each of which may be an example of a UE 115 or a base station 105 described with reference to FIG. 1. In some examples, each wireless device 405 may be a UE, a base station, an IAB node, a smart repeater, a dumb repeater, an RF repeater, a CPE, a sidelink node, a relay node, or any combination thereof. In the following description of the process flow 400, the operations between the wireless devices 405 may be performed in a different order than the example order shown, or the operations performed by the wireless devices 405 may be performed in different orders or at different times. Some operations may also be omitted from the process flow 400, and other operations may be added to the process flow 400. The operations performed by the wireless devices 405 may support improvements to beamformed transmission operations and, in some examples, may promote improvements to communications efficiency, among other benefits.

At 410, wireless devices 405-*a* and 405-*b* may establish a communications link in a first radio frequency spectrum band using beamforming techniques. For example, the wireless device 405-*b* may establish the communications link based on pairing a beam generated at the wireless device 405-*a* with a beam generated at the wireless device 405-*b*. The wireless devices 405-*a* and 405-*b* may pair the beams based on a beam search algorithm. In some examples, each wireless device 405 may generate beams at a respective antenna array. In some cases, such as when an inter-element spacing at the antenna array of the wireless device 405-*a* is greater than a half wavelength corresponding to the carrier frequency of the first radio frequency spectrum band, the antenna array at the wireless device 405-*a* may generate one or more grating lobes, where each grating lobe may be a beam that points in a different direction than a main lobe generated at the antenna array. The wireless device 405-*a* may be unaware which generated beam is paired with the beam generated at the wireless device 405-*b*.

In some examples, at 415 the wireless device 405-*a* may determine a set of beam weights associated with the established communications link. For example, the wireless device 405-*a* may use a codebook of a set of progressive phase shift (PPS) or discrete Fourier transform (DFT) beams (e.g., 16 beams) when scanning directions (e.g., at different angles) to establish the communications link. In some examples, using the set of PPS beams may lead to the antenna array at the wireless device 405-*a* generating the one or more grating lobes. In some examples, at 420 the wireless device 405-*b* may similarly determine the set of beam weights associated with the established communications link.

At 425, the wireless devices 405-*a* and 405-*b* may switch the communications link from operation in the first radio frequency spectrum band to operation in a second radio frequency spectrum band. In some examples, the wireless devices 405-*a* and 405-*b* may operate according to an inter-band CA configuration that includes the first radio frequency spectrum band and the second radio frequency spectrum band. In some examples, a first carrier frequency of the first radio frequency spectrum band may be greater than a second carrier frequency of the second radio frequency spectrum band. In some cases, the antenna array at the wireless device 405-*a* may not generate grating lobes when generating beams in the second radio frequency spectrum band. The grating lobes may result in a beam ambiguity when the wireless devices 405-*a* and 405-*b* attempt to communicate on the established communications link in the second radio frequency spectrum band.

In some examples, at 430 the wireless device 405-*a* may transmit a message to the wireless device 405-*b*. The message may indicate a request for a set of reference signals to resolve the beam ambiguity in the second radio frequency spectrum band. In some examples, the wireless device 405-*a* may transmit the message based on the determined set of beam weights associated with the communications link.

At 435, the wireless device 405-*b* may transmit the set of reference signals to the wireless device 405-*a*, for example based on receiving the message. In some examples, a first reference signal of the set of reference signals may have a QCL relationship with a signal transmitted via the established communications link in the first radio frequency spectrum band. The wireless device 405-*a* may identify the QCL relationship, which may reduce ambiguity when identifying beam directions in the second radio frequency spectrum band. In some examples, the set of reference signals may include an SSB, a CSI-RS, an SRS, or any combination thereof. In some examples, a quantity of transmitted reference signals may correspond to a quantity of lobes (e.g., the main lobe and the one or more grating lobes) the antenna array at the wireless device 405-*a* may generate in the first radio frequency spectrum band.

At 440, the wireless devices 405-*a* and 405-*b* may communicate in the second radio frequency spectrum band according to a beam configuration based on the transmitted set of reference signals. In some examples, the wireless device 405-*a* may generate a beam in a beam direction based on receiving the reference signals, and communicate with the wireless device 405-b via the beam. The operations performed at the wireless devices 405-a and 405-b may improve efficiency and reliability of beamformed communications, among other benefits.

Figure 5:
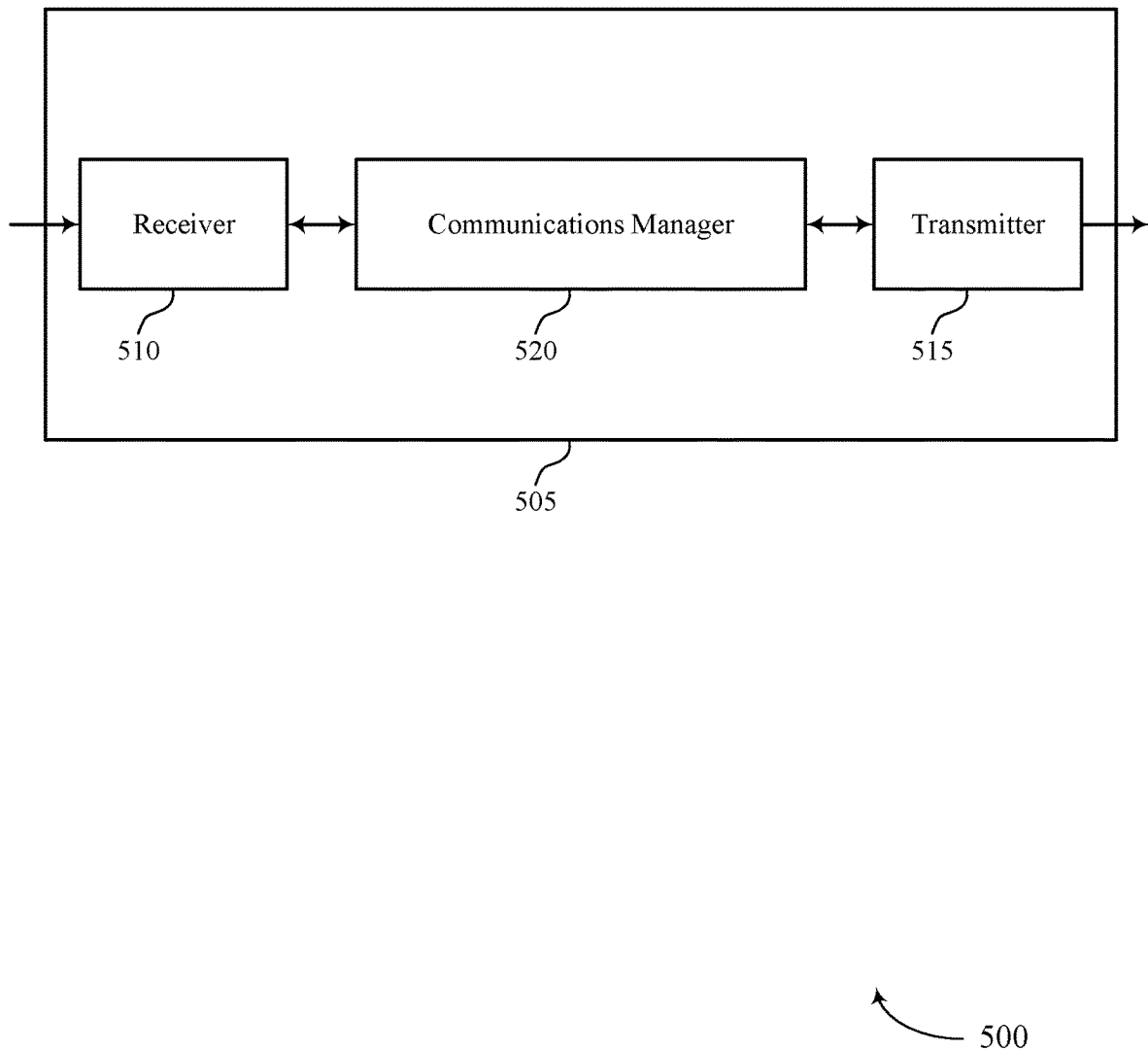
FIGS. 5 and 6 show block diagrams of devices that support techniques for array specific beam refinement in accordance with aspects of the present disclosure.

FIG. 5 shows a block diagram 500 of a device 505 that supports techniques for array specific beam refinement in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for array specific beam refinement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for array specific beam refinement). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for array specific beam refinement as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. For example, the communications manager 520 may be configured as or otherwise support a means for establishing a communications link with a second wireless device in a first radio frequency spectrum band. The communications manager 520 may be configured as or otherwise support a means for receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The communications manager 520 may be configured as or otherwise support a means for communicating with the second wireless device according to a beam configuration in the second radio frequency spectrum band, the beam configuration based on the received set of reference signals, the beam configuration including a second beam direction of the set of beam directions.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing power consumption and increasing transmission reliability. In some aspects, the processor of the device 505 may adjust beamforming parameters based on the received reference signals. For example, the processor of the device 505 may turn on one or more processing units for processing the reference signals, increase a processing clock, or a similar mechanism within the device 505. As such, when subsequent reference signals received, the processor may more accurately adjust beamforming parameters for communications. Improvements in beamformed communications may result in improvements in power saving and communications reliability, which may further increase power efficiency at the device 505 (e.g., by eliminating unnecessary repeated transmissions or beam search algorithms).

Figure 6:
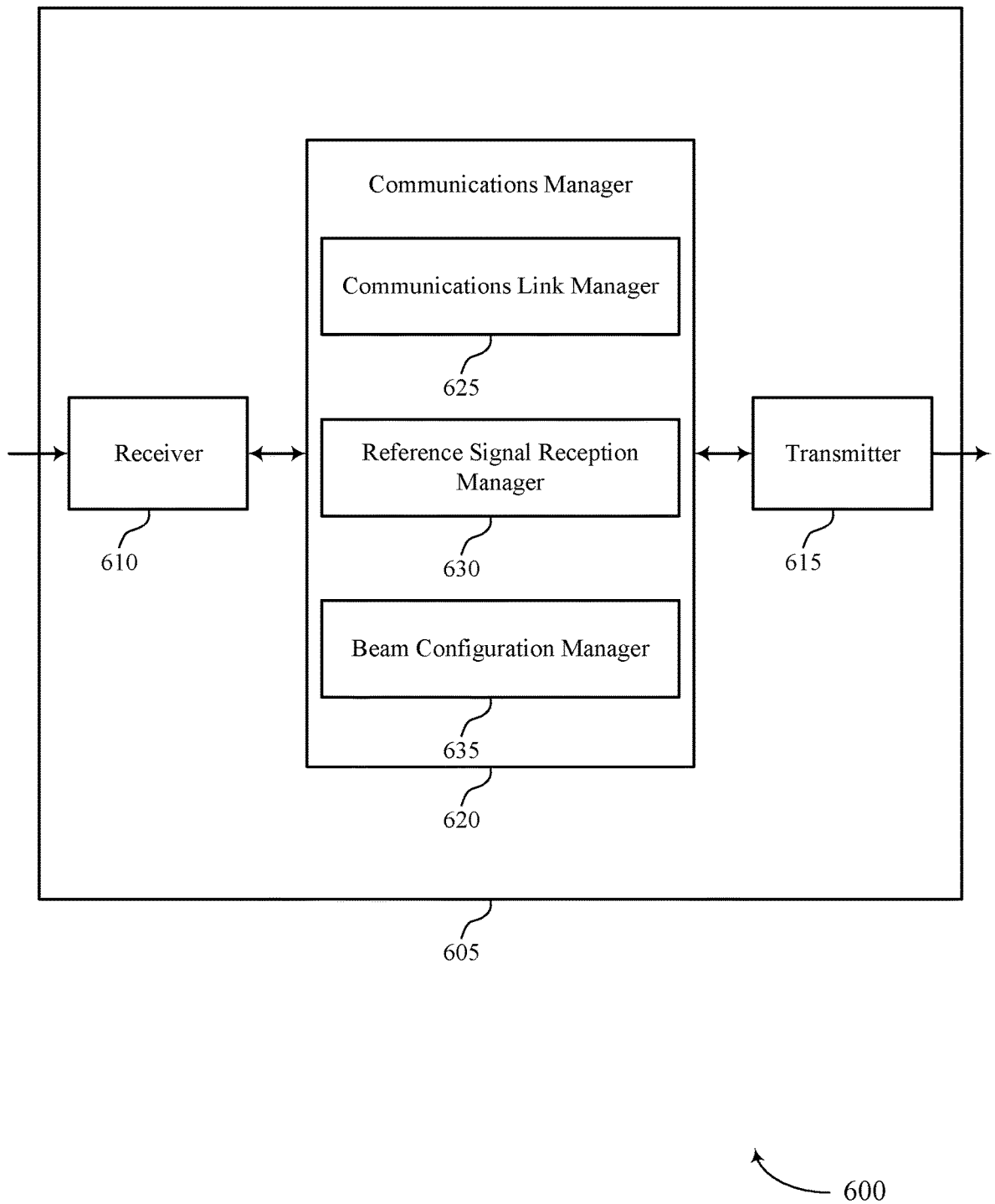

FIG. 6 shows a block diagram 600 of a device 605 that supports techniques for array specific beam refinement in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for array specific beam refinement). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for array specific beam refinement). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for array specific beam refinement as described herein. For example, the communications manager 620 may include a communications link manager 625, a reference signal reception manager 630, a beam configuration manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. The communications link manager 625 may be configured as or otherwise support a means for establishing a communications link with a second wireless device in a first radio frequency spectrum band. The reference signal reception manager 630 may be configured as or otherwise support a means for receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The beam configuration manager 635 may be configured as or otherwise support a means for communicating with the second wireless device according to a beam configuration in the second radio frequency spectrum band, the beam configuration based on the received set of reference signals, the beam configuration including a second beam direction of the set of beam directions.

Figure 7:
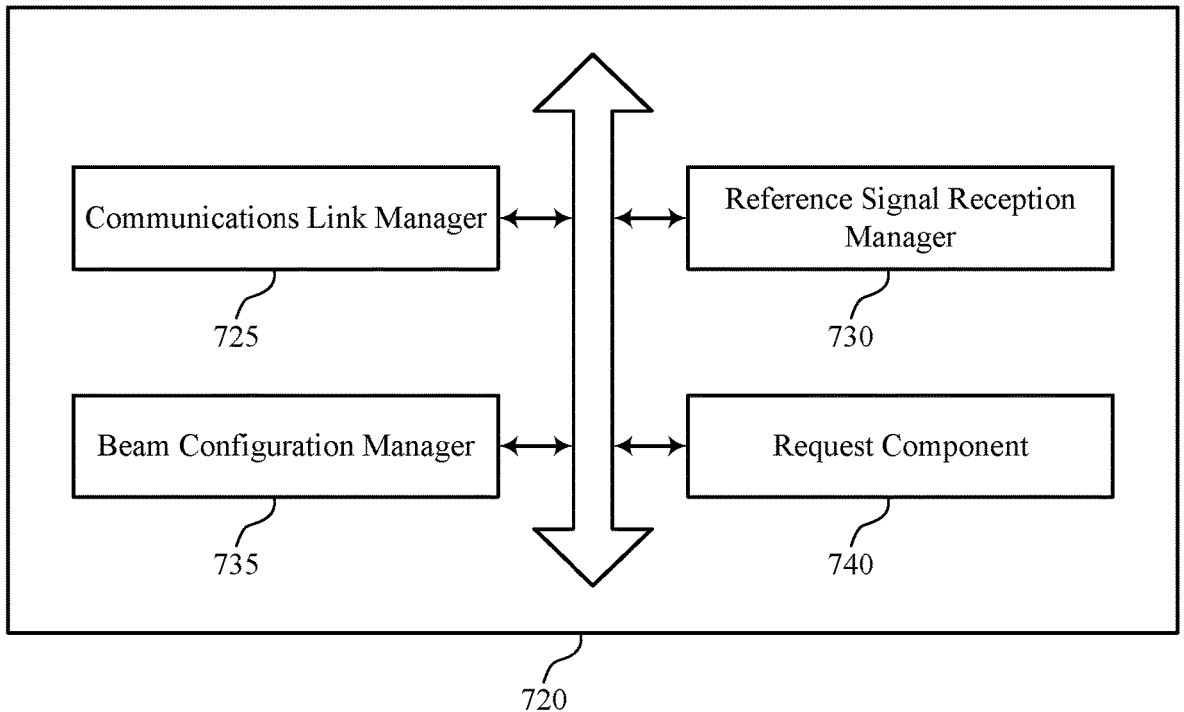
FIG. 7 shows a block diagram of a communications manager that supports techniques for array specific beam refinement in accordance with aspects of the present disclosure.

FIG. 7 shows a block diagram 700 of a communications manager 720 that supports techniques for array specific beam refinement in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for array specific beam refinement as described herein. For example, the communications manager 720 may include a communications link manager 725, a reference signal reception manager 730, a beam configuration manager 735, a request component 740, or any combination thereof. Each of these components may communicate, directly or indirectly, with one another (e.g., via one or more buses).

The communications manager 720 may support wireless communications at a first wireless device in accordance with examples as disclosed herein. The communications link manager 725 may be configured as or otherwise support a means for establishing a communications link with a second wireless device in a first radio frequency spectrum band. The reference signal reception manager 730 may be configured as or otherwise support a means for receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The beam configuration manager 735 may be configured as or otherwise support a means for communicating with the second wireless device according to a beam configuration in the second radio frequency spectrum band, the beam configuration based on the received set of reference signals, the beam configuration including a second beam direction of the set of beam directions.

In some examples, the request component 740 may be configured as or otherwise support a means for transmitting, to the second wireless device, a message indicating a request, where the received set of reference signals is based on the transmitted message.

In some examples, the communications link manager 725 may be configured as or otherwise support a means for determining a set of beam weights associated with the established communications link, where the transmitted message is based on the determined set of beam weights.

In some examples, the first reference signal of the set of reference signals is quasi-colocated with a signal transmitted via the established communications link in the first radio frequency spectrum band, the signal corresponding to the first beam direction of the set of beam directions.

In some examples, a first carrier frequency of the first radio frequency spectrum band is greater than a second carrier frequency of the second radio frequency spectrum band.

In some examples, the set of reference signals include a synchronization signal block, a channel state information reference signal, a sounding reference signal, or any combination thereof.

In some examples, the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

In some examples, the element spacing at the antenna array is based on a wavelength, the wavelength corresponding to the first carrier frequency of the first radio frequency spectrum band, the second carrier frequency of the second radio frequency spectrum band, or a third carrier frequency of a third radio frequency spectrum band.

In some examples, the grating lobe pattern associated with the first radio frequency spectrum band is based on a set of beam weights associated with the established communications link in the first radio frequency spectrum band.

In some examples, the first radio frequency spectrum band is a millimeter wave radio frequency spectrum band greater than 24.25 gigahertz (GHz).

In some examples, the first wireless device includes a user equipment, a customer premises equipment, a sidelink node, a relay node, an integrated access and backhaul node, a smart repeater, a radio frequency repeater, or any combination thereof.

Figure 8:
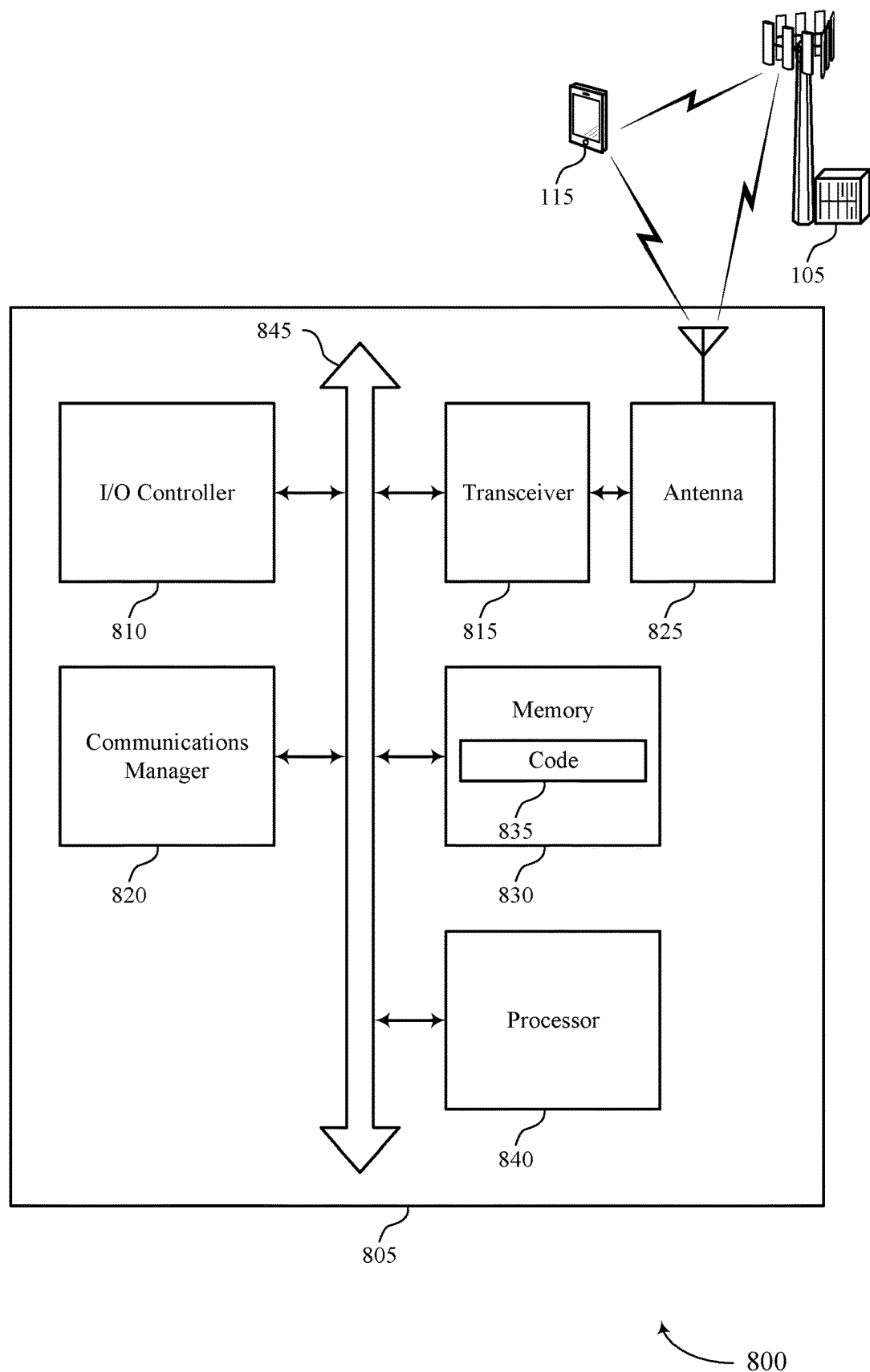
FIG. 8 shows a diagram of a system including a device that supports techniques for array specific beam refinement in accordance with aspects of the present disclosure.

FIG. 8 shows a diagram of a system 800 including a device 805 that supports techniques for array specific beam refinement in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for array specific beam refinement). For example, the device 805 or a component of the device 805 may include a processor 840 and memory 830 coupled to the processor 840, the processor 840 and memory 830 configured to perform various functions described herein.

The communications manager 820 may support wireless communications at a first wireless device in accordance with examples as disclosed herein. For example, the communications manager 820 may be configured as or otherwise support a means for establishing a communications link with a second wireless device in a first radio frequency spectrum band. The communications manager 820 may be configured as or otherwise support a means for receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The communications manager 820 may be configured as or otherwise support a means for communicating with the second wireless device according to a beam configuration in the second radio frequency spectrum band, the beam configuration based on the received set of reference signals, the beam configuration including a second beam direction of the set of beam directions.

By including or configuring the communications manager 820 in accordance with examples as described herein, the device 805 may support techniques for saving power by communicating with wireless devices (as shown in FIG. 1) in beamformed communications more efficiently. For example, the device 805 may improve reliability in beamformed communications with wireless devices, as the device 805 may be able to reliably adjust beamforming parameters for based on received reference signals. Using the techniques described herein, the device 805 may more accurately communicate with the wireless devices, which may improve power efficiency at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for array specific beam refinement as described herein, or the processor 840 and the memory 830 may be otherwise configured to perform or support such operations.

Figure 9:
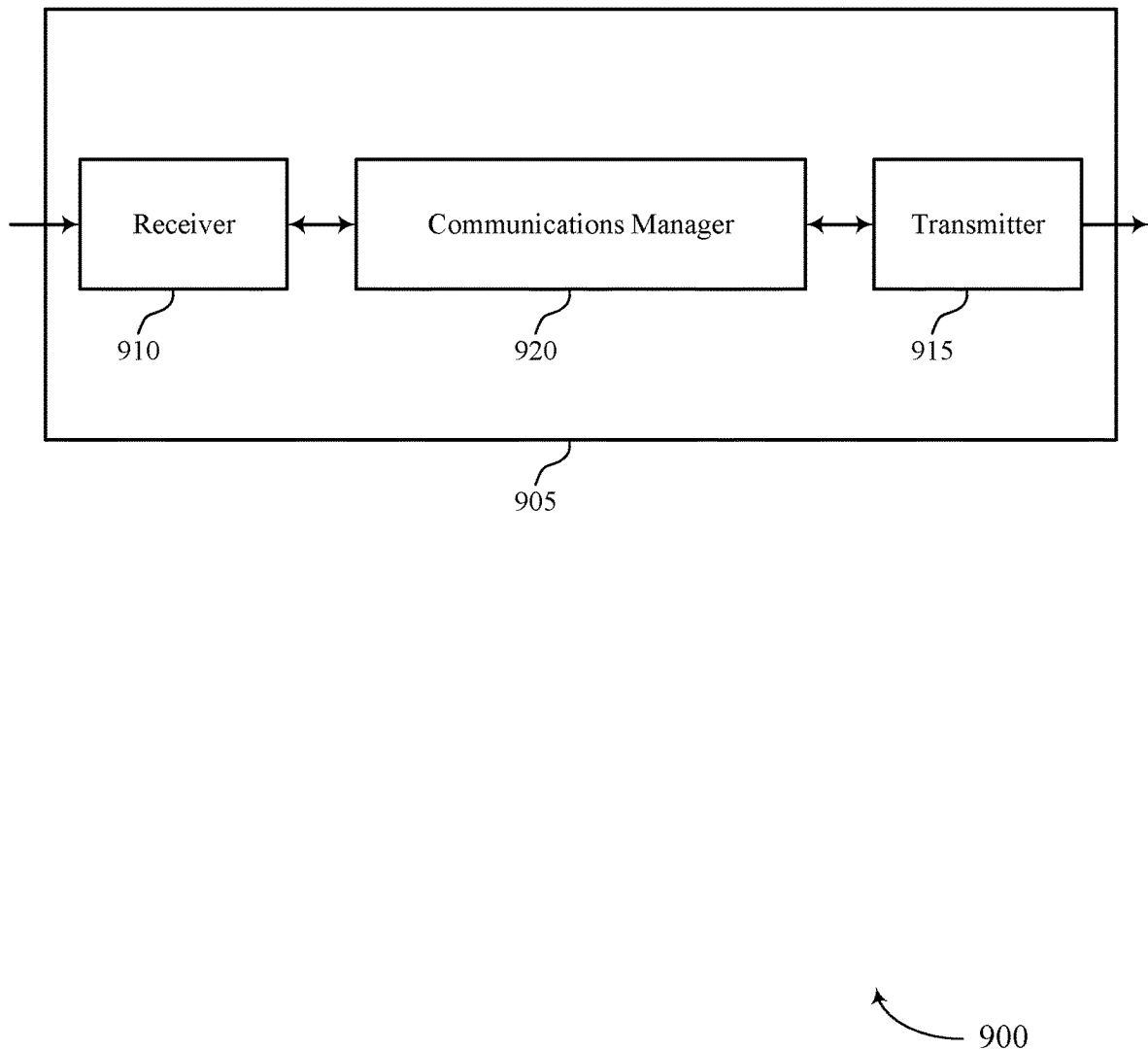
FIGS. 9 and 10 show block diagrams of devices that support techniques for array specific beam refinement in accordance with aspects of the present disclosure.

FIG. 9 shows a block diagram 900 of a device 905 that supports techniques for array specific beam refinement in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for array specific beam refinement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for array specific beam refinement). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for array specific beam refinement as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. For example, the communications manager 920 may be configured as or otherwise support a means for establishing a communications link with a second wireless device in a first radio frequency spectrum band. The communications manager 920 may be configured as or otherwise support a means for transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The communications manager 920 may be configured as or otherwise support a means for communicating with the second wireless device according to a beam configuration in the second radio frequency spectrum band, the beam configuration based on the transmitted set of reference signals, the beam configuration including a second beam direction of the set of beam directions.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for efficient configuration of sidelink communications. In some aspects, the processor of the device 905 may adjust parameters for beamformed communications with wireless devices based on reference signals transmitted to the wireless devices. For example, the processor of the device 905 may turn on one or more processing units for processing reference signals, increase a processing clock, or a similar mechanism within the device 905. As such, when subsequent beamformed communications are to be configured, the processor may more accurately determine associated parameters. Improvements in beamformed communications may result in improvements in power saving and communications reliability, which may further increase power efficiency at the device 905 (e.g., by eliminating unnecessary repeated beam searches).

Figure 10:
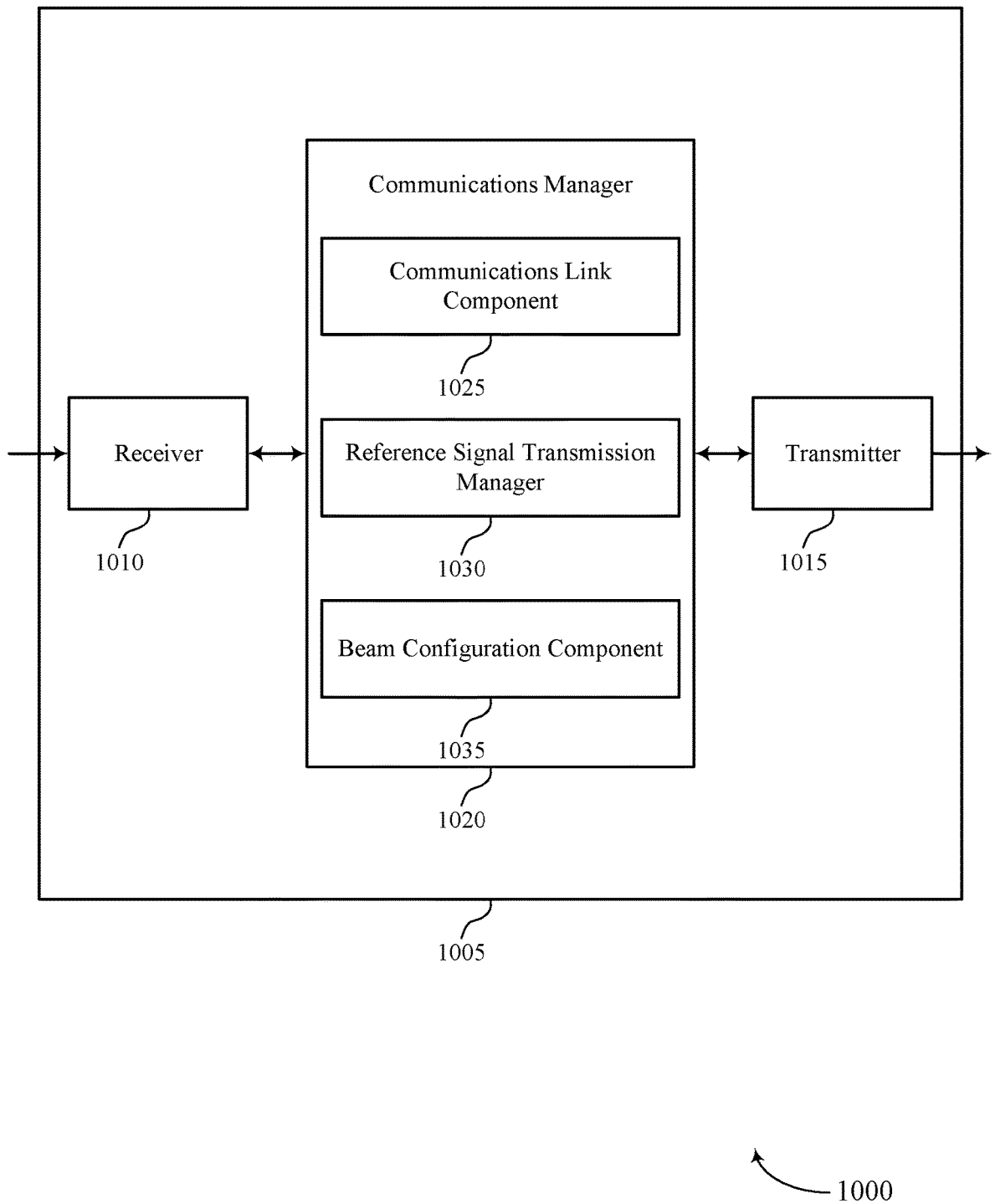

FIG. 10 shows a block diagram 1000 of a device 1005 that supports techniques for array specific beam refinement in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for array specific beam refinement). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for array specific beam refinement). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for array specific beam refinement as described herein. For example, the communications manager 1020 may include a communications link component 1025, a reference signal transmission manager 1030, a beam configuration component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first wireless device in accordance with examples as disclosed herein. The communications link component 1025 may be configured as or otherwise support a means for establishing a communications link with a second wireless device in a first radio frequency spectrum band. The reference signal transmission manager 1030 may be configured as or otherwise support a means for transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The beam configuration component 1035 may be configured as or otherwise support a means for communicating with the second wireless device according to a beam configuration in the second radio frequency spectrum band, the beam configuration based on the transmitted set of reference signals, the beam configuration including a second beam direction of the set of beam directions.

Figure 11:
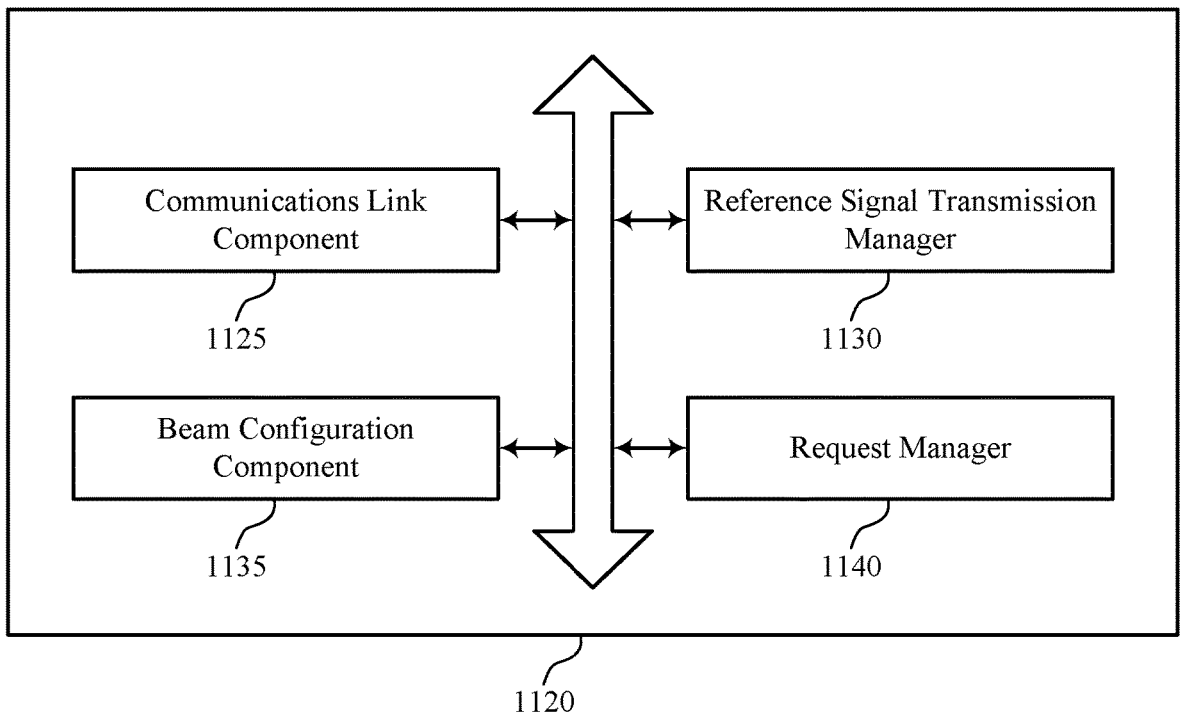
FIG. 11 shows a block diagram of a communications manager that supports techniques for array specific beam refinement in accordance with aspects of the present disclosure.

FIG. 11 shows a block diagram 1100 of a communications manager 1120 that supports techniques for array specific beam refinement in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for array specific beam refinement as described herein. For example, the communications manager 1120 may include a communications link component 1125, a reference signal transmission manager 1130, a beam configuration component 1135, a request manager 1140, or any combination thereof. Each of these components may communicate, directly or indirectly, with one another (e.g., via one or more buses).

The communications manager 1120 may support wireless communications at a first wireless device in accordance with examples as disclosed herein. The communications link component 1125 may be configured as or otherwise support a means for establishing a communications link with a second wireless device in a first radio frequency spectrum band. The reference signal transmission manager 1130 may be configured as or otherwise support a means for transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The beam configuration component 1135 may be configured as or otherwise support a means for communicating with the second wireless device according to a beam configuration in the second radio frequency spectrum band, the beam configuration based on the transmitted set of reference signals, the beam configuration including a second beam direction of the set of beam directions.

In some examples, the request manager 1140 may be configured as or otherwise support a means for receiving, from the second wireless device, a message indicating a request, the transmitted set of reference signal based on the received message.

In some examples, the communications link component 1125 may be configured as or otherwise support a means for determining a set of beam weights associated with the established communications link, where the received message is based on the determined set of beam weights.

In some examples, the first reference signal of the set of reference signals is quasi-colocated with a signal transmitted via the established communications link in the first radio frequency spectrum band, the signal corresponding to the first beam direction of the set of beam directions.

In some examples, a first carrier frequency of the first radio frequency spectrum band is greater than a second carrier frequency of the second radio frequency spectrum band.

In some examples, the set of reference signals include a synchronization signal block, a channel state information reference signal, a sounding reference signal, or any combination thereof.

In some examples, the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

In some examples, the element spacing at the antenna array is based on a wavelength, the wavelength corresponding to the first carrier frequency of the first radio frequency spectrum band, the second carrier frequency of the second radio frequency spectrum band, or a third carrier frequency of a third radio frequency spectrum band.

In some examples, the grating lobe pattern associated with the first radio frequency spectrum band is based on a set of beam weights associated with the established communications link in the first radio frequency spectrum band.

In some examples, the first radio frequency spectrum band is a millimeter wave radio frequency spectrum band greater than 24.25 gigahertz (GHz).

In some examples, the first wireless device includes a base station, a transmission/reception point, a user equipment, a customer premises equipment, a sidelink node, a relay node, an integrated access and backhaul node, a smart repeater, a radio frequency repeater, or any combination thereof.

Figure 12:
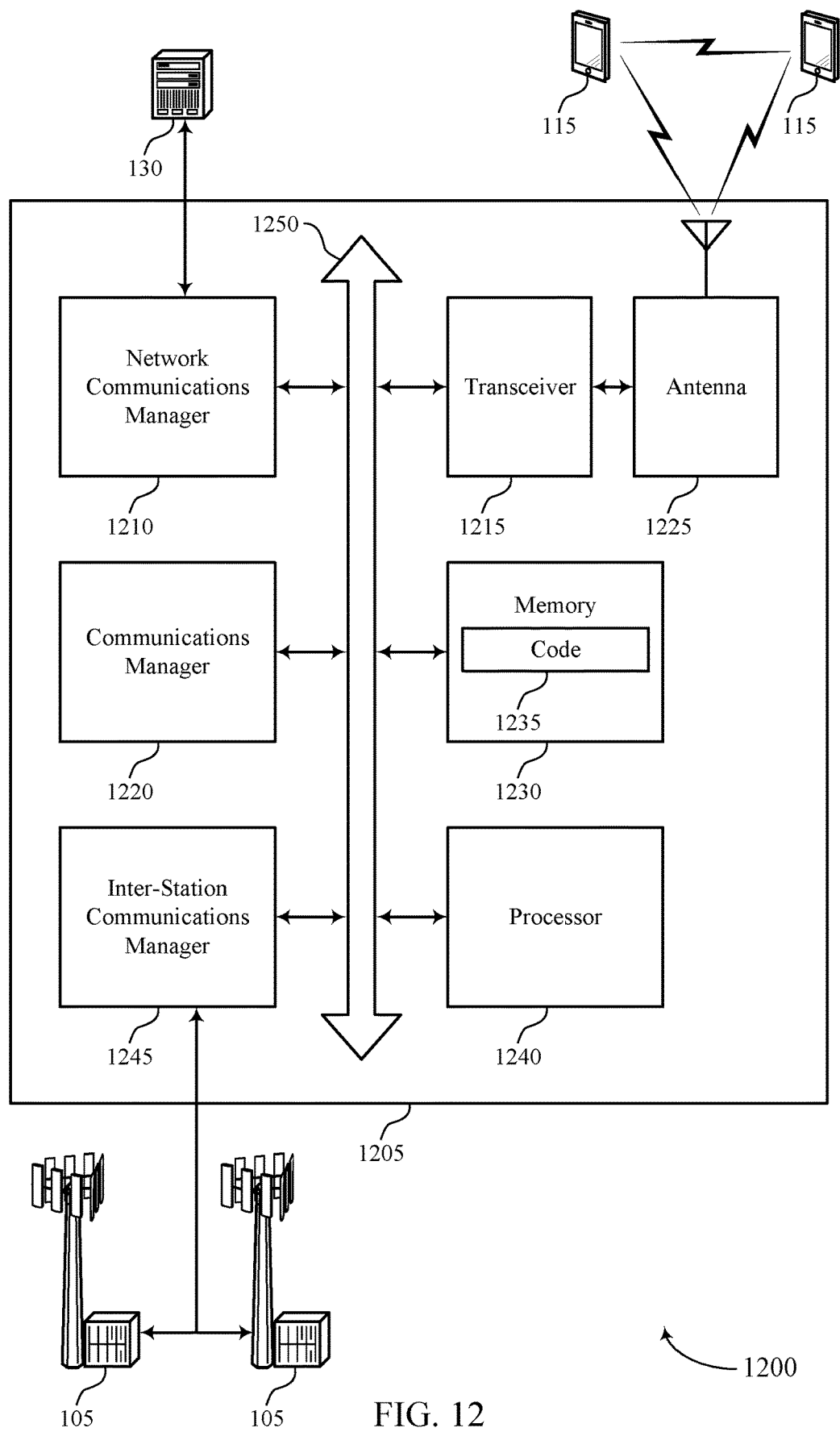
FIG. 12 shows a diagram of a system including a device that supports techniques for array specific beam refinement in accordance with aspects of the present disclosure.

FIG. 12 shows a diagram of a system 1200 including a device 1205 that supports techniques for array specific beam refinement in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for array specific beam refinement). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a first wireless device in accordance with examples as disclosed herein. For example, the communications manager 1220 may be configured as or otherwise support a means for establishing a communications link with a second wireless device in a first radio frequency spectrum band. The communications manager 1220 may be configured as or otherwise support a means for transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The communications manager 1220 may be configured as or otherwise support a means for communicating with the second wireless device according to a beam configuration in the second radio frequency spectrum band, the beam configuration based on the transmitted set of reference signals, the beam configuration including a second beam direction of the set of beam directions.

By including or configuring the communications manager 1220 in accordance with examples as described herein, the device 1205 may support techniques for saving power by communicating with wireless devices (as shown in FIG. 1) more efficiently. For example, the device 1205 may improve reliability in beamformed communications with wireless devices, as the device 1205 may be able to reliably adjust communications links with wireless devices based on transmitted reference signals. Using the techniques described herein, the device 1205 may more accurately communicate with wireless devices, which may improve power efficiency at the device 1205.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for array specific beam refinement as described herein, or the processor 1240 and the memory 1230 may be otherwise configured to perform or support such operations.

Figure 13:
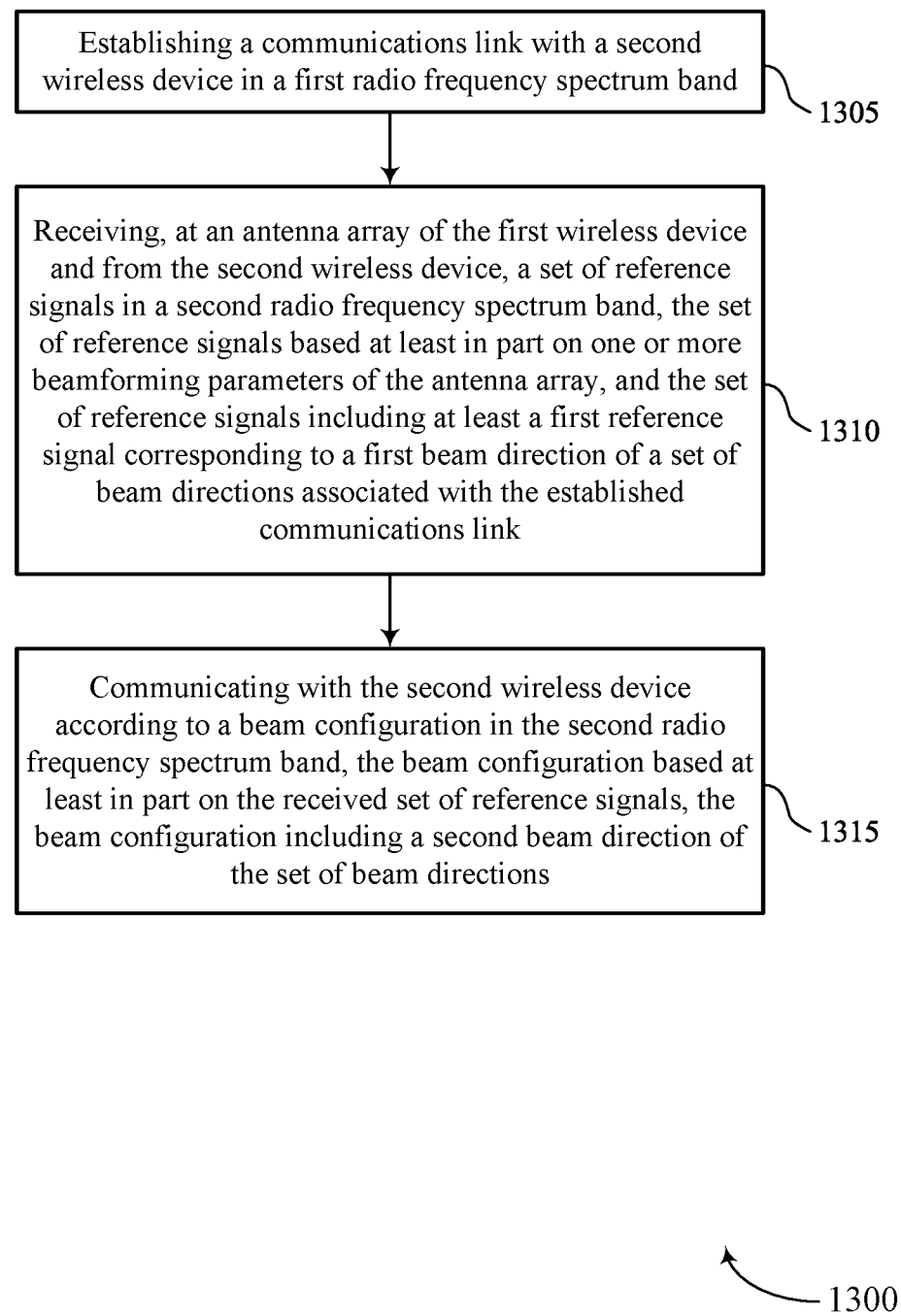
FIGS. 13 through 16 show flowcharts illustrating methods that support techniques for array specific beam refinement in accordance with aspects of the present disclosure.

FIG. 13 shows a flowchart illustrating a method 1300 that supports techniques for array specific beam refinement in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include establishing a communications link with a second wireless device in a first radio frequency spectrum band. The operations of 1305 may be performed in accordance with examples as disclosed herein. In some examples, aspects of the operations of 1305 may be performed by a communications link manager 725 as described with reference to FIG. 7.

At 1310, the method may include receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The operations of 1310 may be performed in accordance with examples as disclosed herein. In some examples, aspects of the operations of 1310 may be performed by a reference signal reception manager 730 as described with reference to FIG. 7.

At 1315, the method may include communicating with the second wireless device according to a beam configuration in the second radio frequency spectrum band, the beam configuration based on the received set of reference signals, the beam configuration including a second beam direction of the set of beam directions. The operations of 1315 may be performed in accordance with examples as disclosed herein. In some examples, aspects of the operations of 1315 may be performed by a beam configuration manager 735 as described with reference to FIG. 7.

Figure 14:
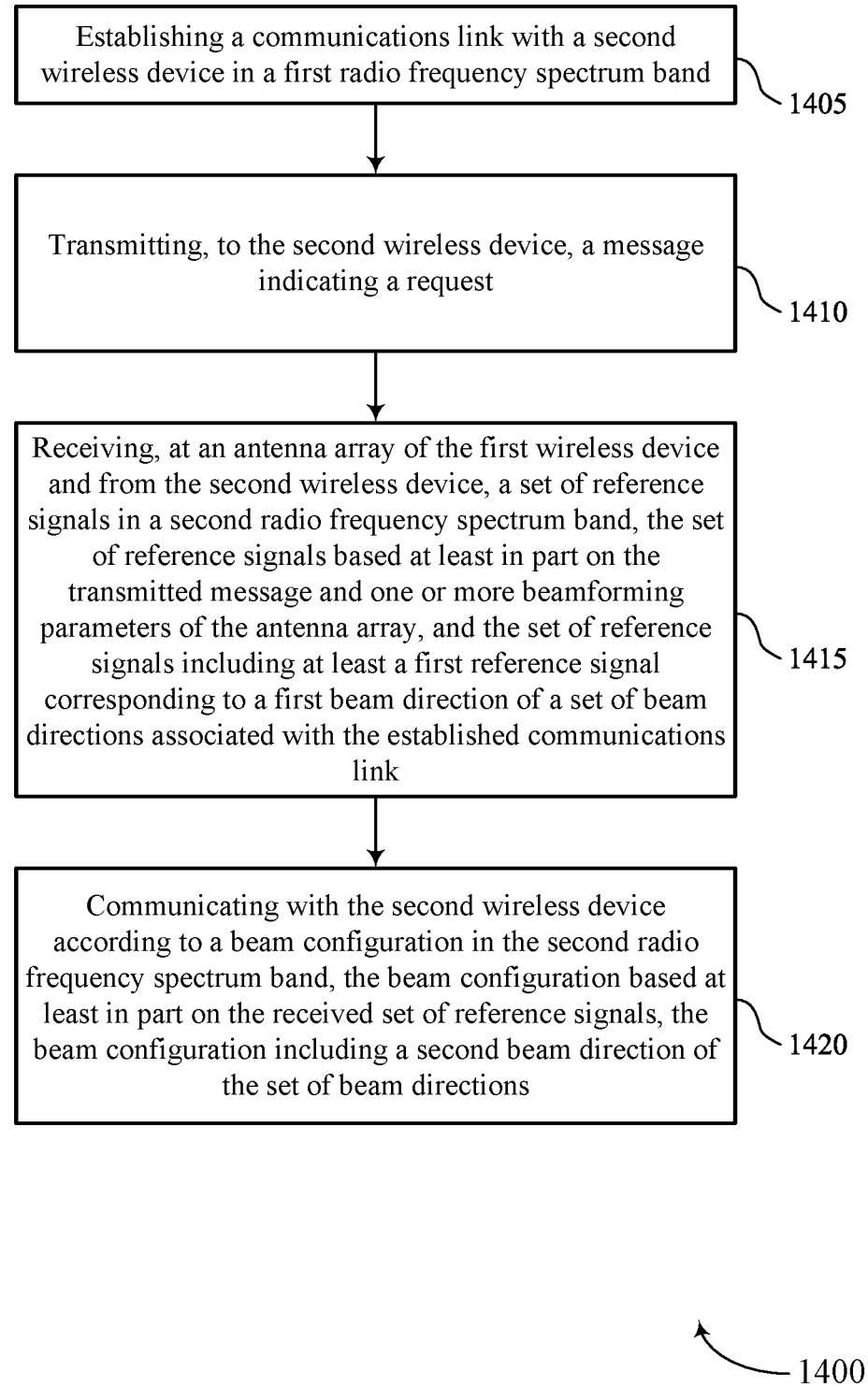

FIG. 14 shows a flowchart illustrating a method 1400 that supports techniques for array specific beam refinement in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include establishing a communications link with a second wireless device in a first radio frequency spectrum band. The operations of 1405 may be performed in accordance with examples as disclosed herein. In some examples, aspects of the operations of 1405 may be performed by a communications link manager 725 as described with reference to FIG. 7.

At 1410, the method may include transmitting, to the second wireless device, a message indicating a request, where the received set of reference signals is based on the transmitted message. The operations of 1410 may be performed in accordance with examples as disclosed herein. In some examples, aspects of the operations of 1410 may be performed by a request component 740 as described with reference to FIG. 7.

At 1415, the method may include receiving, at an antenna array of the first wireless device and from the second wireless device, a set of reference signals in a second radio frequency spectrum band, the set of reference signals based on one or more beamforming parameters of the antenna array, and the set of reference signals including at least a first reference signal corresponding to a first beam direction of a set of beam directions associated with the established communications link. The operations of 1415 may be performed in accordance with examples as disclosed herein. In some examples, aspects of the operations of 1415 may be performed by a reference signal reception manager 730 as described with reference to FIG. 7.

At 1420, the method may include communicating with the second wireless device according to a beam configuration in the second radio frequency spectrum band, the beam configuration based on the received set of reference signals, the beam configuration including a second beam direction of the set of beam directions. The operations of 1420 may be performed in accordance with examples as disclosed herein. In some examples, aspects of the operations of 1420 may be performed by a beam configuration manager 735 as described with reference to FIG. 7.

Figure 15:
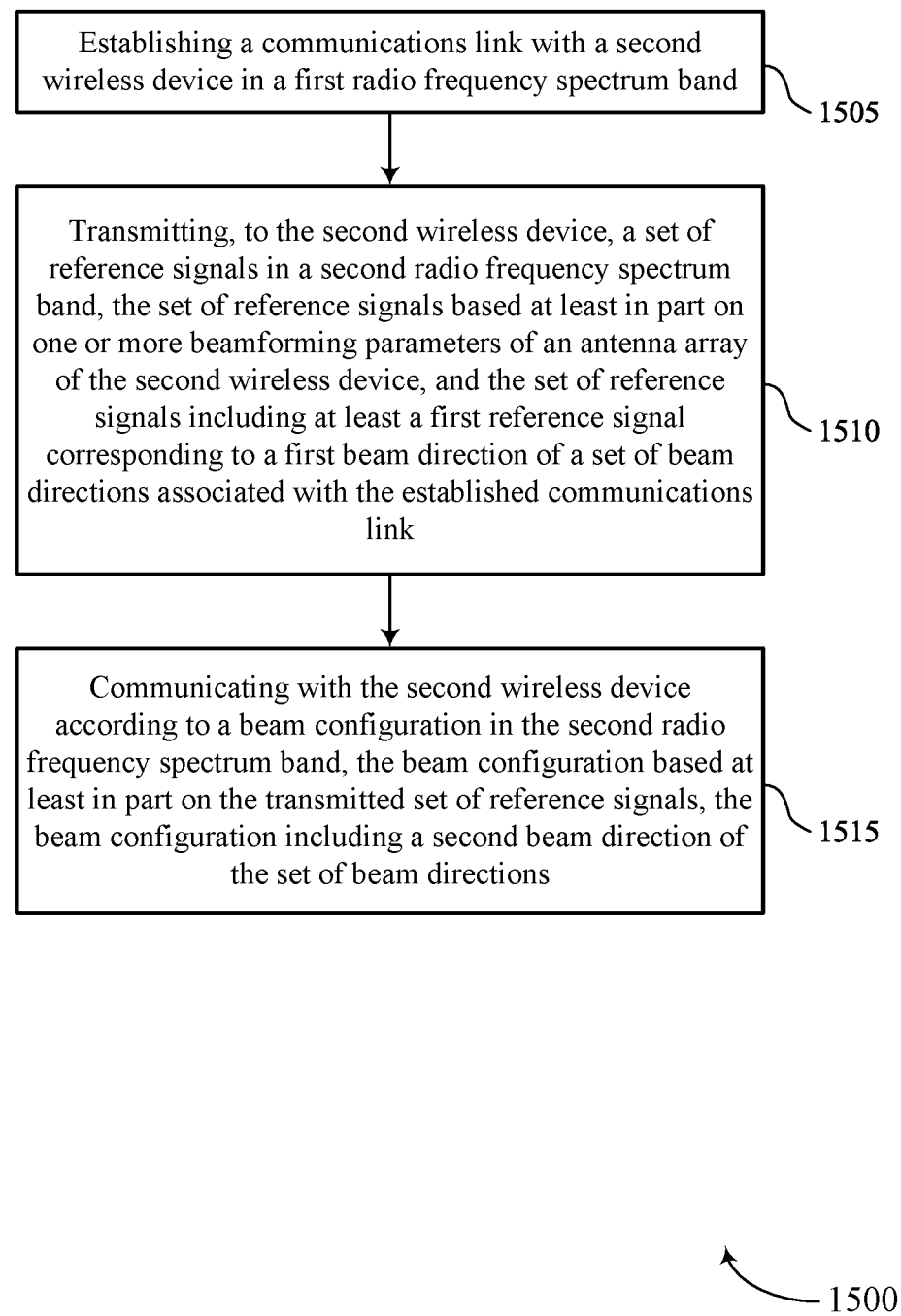

FIG. 15 shows a flowchart illustrating a method 1500 that supports techniques for array specific beam refinement in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include establishing a communications link with a second wireless device in a first radio frequency spectrum band. The operations of 1505 may be performed in accordance with examples as disclosed herein. In some examples, aspects of the operations of 1505 may be performed by a communications link component 1125 as described with reference to FIG. 11.

At 1510, the method may include transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The operations of 1510 may be performed in accordance with examples as disclosed herein. In some examples, aspects of the operations of 1510 may be performed by a reference signal transmission manager 1130 as described with reference to FIG. 11.

At 1515, the method may include communicating with the second wireless device according to a beam configuration in the second radio frequency spectrum band, the beam configuration based on the transmitted set of reference signals, the beam configuration including a second beam direction of the set of beam directions. The operations of 1515 may be performed in accordance with examples as disclosed herein. In some examples, aspects of the operations of 1515 may be performed by a beam configuration component 1135 as described with reference to FIG. 11.

Figure 16:
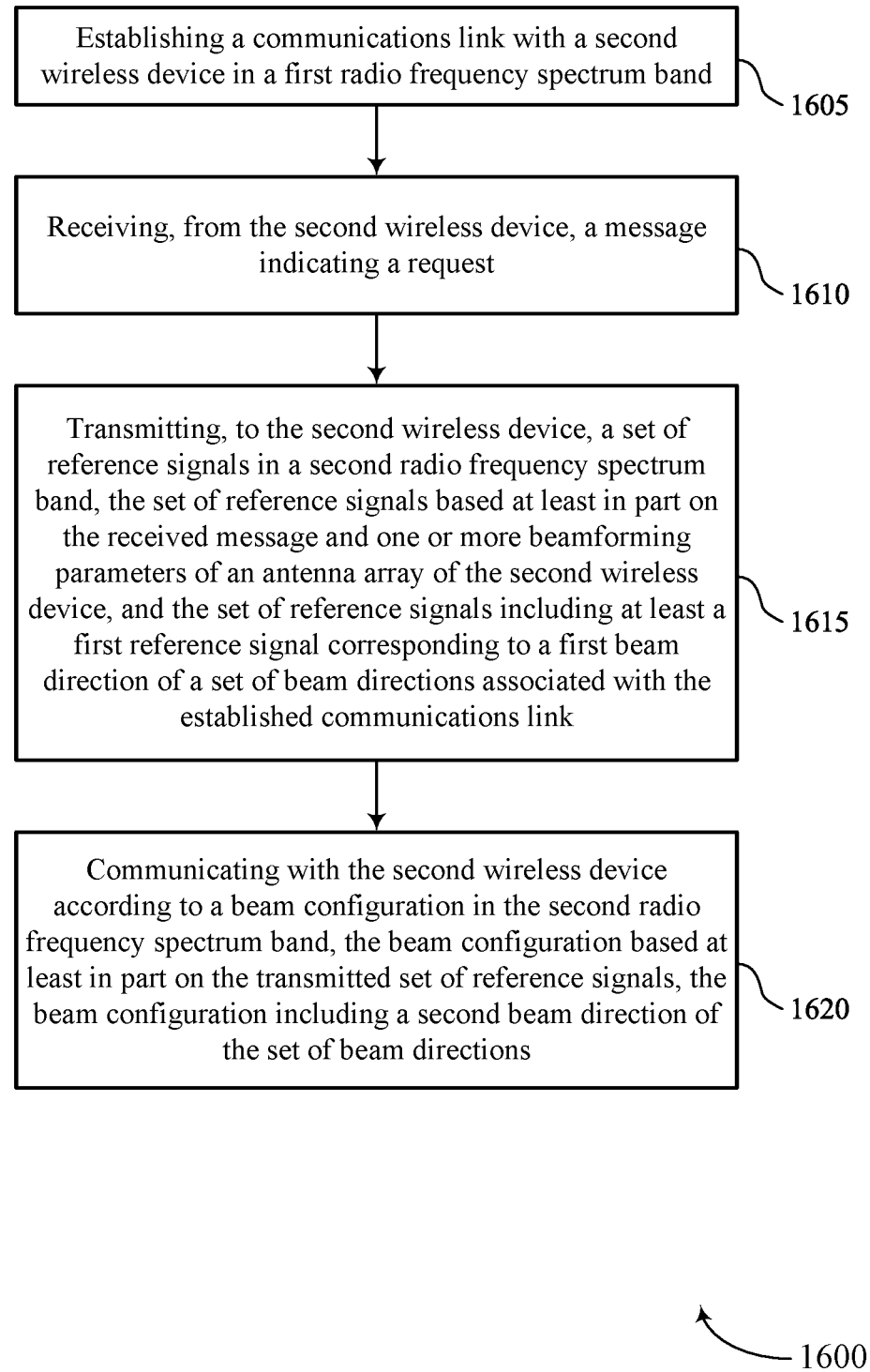

FIG. 16 shows a flowchart illustrating a method 1600 that supports techniques for array specific beam refinement in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include establishing a communications link with a second wireless device in a first radio frequency spectrum band. The operations of 1605 may be performed in accordance with examples as disclosed herein. In some examples, aspects of the operations of 1605 may be performed by a communications link component 1125 as described with reference to FIG. 11.

At 1610, the method may include receiving, from the second wireless device, a message indicating a request, the transmitted set of reference signal based on the received message. The operations of 1610 may be performed in accordance with examples as disclosed herein. In some examples, aspects of the operations of 1610 may be performed by a request manager 1140 as described with reference to FIG. 11.

At 1615, the method may include transmitting, to the second wireless device, a set of reference signals in a second radio frequency spectrum band, the set of reference signals based on one or more beamforming parameters of an antenna array of the second wireless device, and the set of reference signals including at least a first reference signal corresponding to a first beam direction of a set of beam directions associated with the established communications link. The operations of 1615 may be performed in accordance with examples as disclosed herein. In some examples, aspects of the operations of 1615 may be performed by a reference signal transmission manager 1130 as described with reference to FIG. 11.

At 1620, the method may include communicating with the second wireless device according to a beam configuration in the second radio frequency spectrum band, the beam configuration based on the transmitted set of reference signals, the beam configuration including a second beam direction of the set of beam directions. The operations of 1620 may be performed in accordance with examples as disclosed herein. In some examples, aspects of the operations of 1620 may be performed by a beam configuration component 1135 as described with reference to FIG. 11.

The following provides an overview of aspects of the present disclosure:

Aspect 1: A method for wireless communications at a first wireless device, comprising: establishing a communications link with a second wireless device in a first radio frequency spectrum band; receiving, at an antenna array of the first wireless device and from the second wireless device, a set of reference signals in a second radio frequency spectrum band, the set of reference signals based at least in part on one or more beamforming parameters of the antenna array, and the set of reference signals including at least a first reference signal corresponding to a first beam direction of a set of beam directions associated with the established communications link; and communicating with the second wireless device according to a beam configuration in the second radio frequency spectrum band, the beam configuration based at least in part on the received set of reference signals, the beam configuration including a second beam direction of the set of beam directions.

Aspect 2: The method of aspect 1, further comprising: transmitting, to the second wireless device, a message indicating a request, wherein the received set of reference signals is based at least in part on the transmitted message.

Aspect 3: The method of aspect 2, further comprising: determining a set of beam weights associated with the established communications link, wherein the transmitted message is based at least in part on the determined set of beam weights.

Aspect 4: The method of any of aspects 1 through 3, wherein the first reference signal of the set of reference signals is quasi-colocated with a signal transmitted via the established communications link in the first radio frequency spectrum band, the signal corresponding to the first beam direction of the set of beam directions.

Aspect 5: The method of any of aspects 1 through 4, wherein a first carrier frequency of the first radio frequency spectrum band is greater than a second carrier frequency of the second radio frequency spectrum band.

Aspect 6: The method of any of aspects 1 through 5, wherein the set of reference signals comprise a synchronization signal block, a channel state information reference signal, a sounding reference signal, or any combination thereof.

Aspect 7: The method of any of aspects 1 through 6, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

Aspect 8: The method of aspect 7, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

Aspect 9: The method of any of aspects 7 through 8, wherein the grating lobe pattern associated with the first radio frequency spectrum band is based at least in part on a set of beam weights associated with the established communications link in the first radio frequency spectrum band.

Aspect 10: The method of any of aspects 1 through 9, wherein the first radio frequency spectrum band is a millimeter wave radio frequency spectrum band greater than 24.25 gigahertz (GHz).

Aspect 11: The method of any of aspects 1 through 10, wherein the first wireless device comprises a user equipment, a customer premises equipment, a sidelink node, a relay node, an integrated access and backhaul node, a smart repeater, a radio frequency repeater, or any combination thereof.

Aspect 12: A method for wireless communications at a first wireless device, comprising: establishing a communications link with a second wireless device in a first radio frequency spectrum band; transmitting, to the second wireless device, a set of reference signals in a second radio frequency spectrum band, the set of reference signals based at least in part on one or more beamforming parameters of an antenna array of the second wireless device, and the set of reference signals including at least a first reference signal corresponding to a first beam direction of a set of beam directions associated with the established communications link; and communicating with the second wireless device according to a beam configuration in the second radio frequency spectrum band, the beam configuration based at least in part on the transmitted set of reference signals, the beam configuration including a second beam direction of the set of beam directions.

Aspect 13: The method of aspect 12, further comprising: receiving, from the second wireless device, a message indicating a request, the transmitted set of reference signal based at least in part on the received message.

Aspect 14: The method of aspect 13, further comprising: determining a set of beam weights associated with the established communications link, wherein the received message is based at least in part on the determined set of beam weights.

Aspect 15: The method of any of aspects 12 through 14, wherein the first reference signal of the set of reference signals is quasi-colocated with a signal transmitted via the established communications link in the first radio frequency spectrum band, the signal corresponding to the first beam direction of the set of beam directions.

Aspect 16: The method of any of aspects 12 through 15, wherein a first carrier frequency of the first radio frequency spectrum band is greater than a second carrier frequency of the second radio frequency spectrum band.

Aspect 17: The method of any of aspects 12 through 16, wherein the set of reference signals comprise a synchronization signal block, a channel state information reference signal, a sounding reference signal, or any combination thereof.

Aspect 18: The method of any of aspects 12 through 17, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof.

Aspect 19: The method of aspect 18, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

Aspect 20: The method of any of aspects 18 through 19, wherein the grating lobe pattern associated with the first radio frequency spectrum band is based at least in part on a set of beam weights associated with the established communications link in the first radio frequency spectrum band.

Aspect 21: The method of any of aspects 12 through 20, wherein the first radio frequency spectrum band is a millimeter wave radio frequency spectrum band greater than 24.25 gigahertz (GHz).

Aspect 22: The method of any of aspects 12 through 21, wherein the first wireless device comprises a base station, a transmission/reception point, a user equipment, a customer premises equipment, a sidelink node, a relay node, an integrated access and backhaul node, a smart repeater, a radio frequency repeater, or any combination thereof.

Aspect 23: An apparatus for wireless communications at a first wireless device, comprising a processor; memory coupled with the processor; and instructions stored in the memory and executable by the processor to cause the apparatus to perform a method of any of aspects 1 through 11.

Aspect 24: An apparatus for wireless communications at a first wireless device, comprising at least one means for performing a method of any of aspects 1 through 11.

Aspect 25: A non-transitory computer-readable medium storing code for wireless communications at a first wireless device, the code comprising instructions executable by a processor to perform a method of any of aspects 1 through 11.

Aspect 26: An apparatus for wireless communications at a first wireless device, comprising a processor; memory coupled with the processor; and instructions stored in the memory and executable by the processor to cause the apparatus to perform a method of any of aspects 12 through 22.

Aspect 27: An apparatus for wireless communications at a first wireless device, comprising at least one means for performing a method of any of aspects 12 through 22.

Aspect 28: A non-transitory computer-readable medium storing code for wireless communications at a first wireless device, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    establishing a communications link with a second wireless device in a first radio frequency spectrum band;
    receiving, at an antenna array of the first wireless device and from the second wireless device, a set of reference signals in a second radio frequency spectrum band, the set of reference signals based at least in part on one or more beamforming parameters of the antenna array, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
    communicating with the second wireless device according to a beam configuration in the second radio frequency spectrum band, the beam configuration based at least in part on the received set of reference signals, the beam configuration including a second beam direction of the set of beam directions.

2. The method of claim 1, further comprising:
transmitting, to the second wireless device, a message indicating a request, wherein the received set of reference signals is based at least in part on the transmitted message.

3. The method of claim 2, further comprising:
determining a set of beam weights associated with the established communications link, wherein the transmitted message is based at least in part on the determined set of beam weights.

4. The method of claim 1, wherein the first reference signal of the set of reference signals is quasi-colocated with a signal transmitted via the established communications link in the first radio frequency spectrum band, the signal corresponding to the first beam direction of the set of beam directions.

5. The method of claim 1, wherein a first carrier frequency of the first radio frequency spectrum band is greater than a second carrier frequency of the second radio frequency spectrum band.

6. The method of claim 1, wherein the set of reference signals comprise a synchronization signal block, a channel state information reference signal, a sounding reference signal, or any combination thereof.

7. The method of claim 1, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

8. The method of claim 1, wherein the grating lobe pattern associated with the first radio frequency spectrum band is based at least in part on a set of beam weights associated with the established communications link in the first radio frequency spectrum band.

9. The method of claim 1, wherein the first radio frequency spectrum band is a millimeter wave radio frequency spectrum band greater than 24.25 gigahertz (GHz).

10. The method of claim 1, wherein the first wireless device comprises a user equipment, a customer premises equipment, a sidelink node, a relay node, an integrated access and backhaul node, a smart repeater, a radio frequency repeater, or any combination thereof.

11. A method for wireless communications at a first wireless device, comprising:
establishing a communications link with a second wireless device in a first radio frequency spectrum band;
transmitting, to the second wireless device, a set of reference signals in a second radio frequency spectrum band, the set of reference signals based at least in part on one or more beamforming parameters of an antenna array of the second wireless device, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
communicating with the second wireless device according to a beam configuration in the second radio frequency spectrum band, the beam configuration based at least in part on the transmitted set of reference signals, the beam configuration including a second beam direction of the set of beam directions.

12. The method of claim 11, further comprising:
receiving, from the second wireless device, a message indicating a request, the transmitted set of reference signal based at least in part on the received message.

13. The method of claim 12, further comprising:
determining a set of beam weights associated with the established communications link, wherein the received message is based at least in part on the determined set of beam weights.

14. The method of claim 11, wherein the first reference signal of the set of reference signals is quasi-colocated with a signal transmitted via the established communications link in the first radio frequency spectrum band, the signal corresponding to the first beam direction of the set of beam directions.

15. The method of claim 11, wherein a first carrier frequency of the first radio frequency spectrum band is greater than a second carrier frequency of the second radio frequency spectrum band.

16. The method of claim 11, wherein the set of reference signals comprise a synchronization signal block, a channel state information reference signal, a sounding reference signal, or any combination thereof.

17. The method of claim 11, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

18. The method of claim 11, wherein the grating lobe pattern associated with the first radio frequency spectrum band is based at least in part on a set of beam weights associated with the established communications link in the first radio frequency spectrum band.

19. The method of claim 11, wherein the first radio frequency spectrum band is a millimeter wave radio frequency spectrum band greater than 24.25 gigahertz (GHz).

20. The method of claim 11, wherein the first wireless device comprises a base station, a transmission/reception point, a user equipment, a customer premises equipment, a sidelink node, a relay node, an integrated access and backhaul node, a smart repeater, a radio frequency repeater, or any combination thereof.

21. An apparatus for wireless communications at a first wireless device, comprising:
a processor;
memory coupled with the processor; and
instructions stored in the memory and executable by the processor to cause the apparatus to:
establish a communications link with a second wireless device in a first radio frequency spectrum band;
receive, at an antenna array of the first wireless device and from the second wireless device, a set of reference signals in a second radio frequency spectrum band, the set of reference signals based at least in part on one or more beamforming parameters of the antenna array, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and communicate with the second wireless device according to a beam configuration in the second radio frequency spectrum band, the beam configuration based at least in part on the received set of reference signals, the beam configuration including a second beam direction of the set of beam directions.

22. The apparatus of claim 21, wherein the instructions are further executable by the processor to cause the apparatus to:

transmit, to the second wireless device, a message indicating a request, wherein the received set of reference signals is based at least in part on the transmitted message.

23. The apparatus of claim 22, wherein the instructions are further executable by the processor to cause the apparatus to:

determine a set of beam weights associated with the established communications link, wherein the transmitted message is based at least in part on the determined set of beam weights.

24. The apparatus of claim 21, wherein the first reference signal of the set of reference signals is quasi-colocated with a signal transmitted via the established communications link in the first radio frequency spectrum band, the signal corresponding to the first beam direction of the set of beam directions.

25. The apparatus of claim 21, wherein a first carrier frequency of the first radio frequency spectrum band is greater than a second carrier frequency of the second radio frequency spectrum band.

26. The apparatus of claim 21, wherein the set of reference signals comprise a synchronization signal block, a channel state information reference signal, a sounding reference signal, or any combination thereof.

27. The apparatus of claim 21, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

28. The apparatus of claim 21, wherein the grating lobe pattern associated with the first radio frequency spectrum band is based at least in part on a set of beam weights associated with the established communications link in the first radio frequency spectrum band.

29. The apparatus of claim 21, wherein the first radio frequency spectrum band is a millimeter wave radio frequency spectrum band greater than 24.25 gigahertz (GHz).

30. The apparatus of claim 21, wherein the first wireless device comprises a user equipment, a customer premises equipment, a sidelink node, a relay node, an integrated access and backhaul node, a smart repeater, a radio frequency repeater, or any combination thereof.

31. An apparatus for wireless communications at a first wireless device, comprising:

a processor;
memory coupled with the processor; and
instructions stored in the memory and executable by the processor to cause the apparatus to:
establish a communications link with a second wireless device in a first radio frequency spectrum band;

transmit, to the second wireless device, a set of reference signals in a second radio frequency spectrum band, the set of reference signals based at least in part on one or more beamforming parameters of an antenna array of the second wireless device, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and communicate with the second wireless device according to a beam configuration in the second radio frequency spectrum band, the beam configuration based at least in part on the transmitted set of reference signals, the beam configuration including a second beam direction of the set of beam directions.

32. The apparatus of claim 31, wherein the instructions are further executable by the processor to cause the apparatus to:

receive, from the second wireless device, a message indicating a request, the transmitted set of reference signal based at least in part on the received message.

33. The apparatus of claim 32, wherein the instructions are further executable by the processor to cause the apparatus to:

determine a set of beam weights associated with the established communications link, wherein the received message is based at least in part on the determined set of beam weights.

34. The apparatus of claim 31, wherein the first reference signal of the set of reference signals is quasi-colocated with a signal transmitted via the established communications link in the first radio frequency spectrum band, the signal corresponding to the first beam direction of the set of beam directions.

35. The apparatus of claim 31, wherein a first carrier frequency of the first radio frequency spectrum band is greater than a second carrier frequency of the second radio frequency spectrum band.

36. The apparatus of claim 31, wherein the set of reference signals comprise a synchronization signal block, a channel state information reference signal, a sounding reference signal, or any combination thereof.

37. The apparatus of claim 31, wherein the element spacing at the antenna array is based at least in part on a wavelength, the wavelength corresponding to the first carrier frequency of the first radio frequency spectrum band, the second carrier frequency of the second radio frequency spectrum band, or a third carrier frequency of a third radio frequency spectrum band.

38. The apparatus of claim 31, wherein the grating lobe pattern associated with the first radio frequency spectrum band is based at least in part on a set of beam weights associated with the established communications link in the first radio frequency spectrum band.

39. The apparatus of claim 31, wherein the first radio frequency spectrum band is a millimeter wave radio frequency spectrum band greater than 24.25 gigahertz (GHz).

40. The apparatus of claim 31, wherein the first wireless device comprises a base station, a transmission/reception point, a user equipment, a customer premises equipment, a sidelink node, a relay node, an integrated access and backhaul node, a smart repeater, a radio frequency repeater, or any combination thereof.

41. An apparatus for wireless communications at a first wireless device, comprising:
- means for establishing a communications link with a second wireless device in a first radio frequency spectrum band;
- means for receiving, at an antenna array of the first wireless device and from the second wireless device, a set of reference signals in a second radio frequency spectrum band, the set of reference signals based at least in part on one or more beamforming parameters of the antenna array, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
- means for communicating with the second wireless device according to a beam configuration in the second radio frequency spectrum band, the beam configuration based at least in part on the received set of reference signals, the beam configuration including a second beam direction of the set of beam directions.

42. An apparatus for wireless communications at a first wireless device, comprising:
- means for establishing a communications link with a second wireless device in a first radio frequency spectrum band;
- means for transmitting, to the second wireless device, a set of reference signals in a second radio frequency spectrum band, the set of reference signals based at least in part on one or more beamforming parameters of an antenna array of the second wireless device, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
- means for communicating with the second wireless device according to a beam configuration in the second radio frequency spectrum band, the beam configuration based at least in part on the transmitted set of reference signals, the beam configuration including a second beam direction of the set of beam directions.

43. A non-transitory computer-readable medium storing code for wireless communications at a first wireless device, the code comprising instructions executable by a processor to:
- establish a communications link with a second wireless device in a first radio frequency spectrum band;
- receive, at an antenna array of the first wireless device and from the second wireless device, a set of reference signals in a second radio frequency spectrum band, the set of reference signals based at least in part on one or more beamforming parameters of the antenna array, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
- communicate with the second wireless device according to a beam configuration in the second radio frequency spectrum band, the beam configuration based at least in part on the received set of reference signals, the beam configuration including a second beam direction of the set of beam directions.

44. A non-transitory computer-readable medium storing code for wireless communications at a first wireless device, the code comprising instructions executable by a processor to:
- establish a communications link with a second wireless device in a first radio frequency spectrum band;
- transmit, to the second wireless device, a set of reference signals in a second radio frequency spectrum band, the set of reference signals based at least in part on one or more beamforming parameters of an antenna array of the second wireless device, and the set of reference signals including at least a first reference signal corresponding to a first beam direction of a set of beam directions associated with the established communications link, wherein the one or more beamforming parameters include a grating lobe pattern associated with the first radio frequency spectrum band, a first carrier frequency of the first radio frequency spectrum band, a second carrier frequency of the second radio frequency spectrum band, an element spacing at the antenna array, a carrier aggregation configuration, or any combination thereof; and
- communicate with the second wireless device according to a beam configuration in the second radio frequency spectrum band, the beam configuration based at least in part on the transmitted set of reference signals, the beam configuration including a second beam direction of the set of beam directions.

\* \* \* \* \*